US010705961B2

(12) United States Patent
Liu et al.

(10) Patent No.: US 10,705,961 B2
(45) Date of Patent: Jul. 7, 2020

(54) SCALABLY MECHANISM TO IMPLEMENT AN INSTRUCTION THAT MONITORS FOR WRITES TO AN ADDRESS

(71) Applicants: Yen-Cheng Liu, Portland, OR (US); Bahaa Fahim, San Jose, CA (US); Erik G. Hallnor, Beaverton, OR (US); Jeffrey D. Chamberlain, Tracy, CA (US); Stephen R. Van Doren, Portland, OR (US); Antonio Juan, Barcelona (ES)

(72) Inventors: Yen-Cheng Liu, Portland, OR (US); Bahaa Fahim, San Jose, CA (US); Erik G. Hallnor, Beaverton, OR (US); Jeffrey D. Chamberlain, Tracy, CA (US); Stephen R. Van Doren, Portland, OR (US); Antonio Juan, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/040,375

(22) Filed: Sep. 27, 2013

(65) Prior Publication Data

US 2015/0095580 A1 Apr. 2, 2015

(51) Int. Cl.
G06F 12/08 (2016.01)
G06F 12/084 (2016.01)
(Continued)

(52) U.S. Cl.
CPC ............. *G06F 12/084* (2013.01); *G06F 9/00* (2013.01); *G06F 12/0811* (2013.01);
(Continued)

(58) Field of Classification Search
CPC ...... G06F 12/084; G06F 3/0653; G06F 11/30; G06F 11/301; G06F 11/3037; G06F 2201/885; G06F 2201/86
See application file for complete search history.

(56) References Cited

U.S. PATENT DOCUMENTS 7,363,474 B2  4/2008 Rodgers et al.
7,953,993 B2  5/2011 Allarey et al.
(Continued)

FOREIGN PATENT DOCUMENTS

CN  101097544 A  1/2008
CN  101460927 A  6/2009
(Continued)

OTHER PUBLICATIONS

International Search Report and Written Opinion received for PCT Patent Application No. PCT/US2014/059130, dated Feb. 24, 2015, 14 pages.
(Continued)

Primary Examiner — William B Partridge
Assistant Examiner — Eric T Loonan
(74) Attorney, Agent, or Firm — Nicholson De Vos Webster & Elliott LLP

(57) ABSTRACT

A processor includes a cache-side address monitor unit corresponding to a first cache portion of a distributed cache that has a total number of cache-side address monitor storage locations less than a total number of logical processors of the processor. Each cache-side address monitor storage location is to store an address to be monitored. A core-side address monitor unit corresponds to a first core and has a same number of core-side address monitor storage locations as a number of logical processors of the first core. Each core-side address monitor storage location is to store an address, and a monitor state for a different corresponding (Continued)

logical processor of the first core. A cache-side address monitor storage overflow unit corresponds to the first cache portion, and is to enforce an address monitor storage overflow policy when no unused cache-side address monitor storage location is available to store an address to be monitored.

21 Claims, 14 Drawing Sheets

(51) Int. Cl.
    *G06F 12/0831*     (2016.01)
    *G06F 12/0846*     (2016.01)
    *G06F 12/0811*     (2016.01)
    *G06F 9/00*     (2006.01)

(52) U.S. Cl.
    CPC ...... *G06F 12/0833* (2013.01); *G06F 12/0846* (2013.01); *G06F 2212/1016* (2013.01)

(56) References Cited

U.S. PATENT DOCUMENTS

| | | | |
|---|---|---|---|
| 9,081,687 | B2 | 7/2015 | Offen et al. |
| 2006/0059317 | A1 | 3/2006 | Kakeda |
| 2007/0282928 | A1* | 12/2007 | Jiao ..................... G06F 12/0875 |
| 2008/0005504 | A1* | 1/2008 | Barnes ................ G06F 12/0815 |
| | | | 711/156 |
| 2009/0144524 | A1 | 6/2009 | Shen et al. |
| 2009/0172284 | A1* | 7/2009 | Offen ................... G06F 12/084 |
| | | | 711/125 |
| 2012/0079240 | A1 | 3/2012 | Anderson et al. |
| 2015/0269074 | A1 | 9/2015 | Shah et al. |
| 2016/0357674 | A1 | 12/2016 | Waldspurger et al. |

FOREIGN PATENT DOCUMENTS

| | | |
|---|---|---|
| JP | 2006-500639 A | 1/2006 |
| JP | 2007-520769 A | 7/2007 |
| JP | 2009-537053 A | 10/2009 |
| JP | 2009-540438 A | 11/2009 |
| TW | 200636467 A | 10/2006 |
| WO | 02/39273 A1 | 5/2002 |
| WO | 2007/146544 A2 | 12/2007 |
| WO | 2015/048826 A1 | 4/2015 |

OTHER PUBLICATIONS

Office Action received for Taiwan Patent Application No. 103133034, dated Nov. 25, 2015, 9 pages of English Translation and 10 pages of Taiwan Office Action.
International Preliminary Report on Patentability and Written Opinion Received for PCT Patent Application No. PCT/US2014/059130, dated Apr. 7, 2016, 11 pages.
Notice of Allowance received for Taiwan Patent Application No. 103133034, dated Jul. 19, 2016, 2 pages of Taiwan Notice of Allowance Only.
Office Action received for Japanese Patent Application No. 2016-545961, dated Apr. 4, 2017, 2 pages of Japanese Office Action Only.
Office Action received for Korean Patent Application No. 10-2016-7005327, dated Jun. 20, 2017, 19 pages of Korean Office Action including 10 pages of English Translation.
Notice of Allowance received for Japanese Patent Application No. 2016-545961, dated Sep. 12, 2017, 4 pages of Japanese Notice of Allowance including 3 pages of English Translation.
Office Action received for Japanese Patent Application No. 2016-545961, dated Apr. 4, 2017, 4 pages of Japanese Office Action including 2 pages of English Translation.
Extended European Search Report received for European Patent Application No. 14849874.4, dated Sep. 20, 2017, 11 pages.
Office Action received for Chinese Patent Application No. 201480047555.X, dated Nov. 3, 2017, 13 pages of Chinese Office Action including 8 pages of English Translation.
Notice of allowance from foreign counterpart Korean Patent Application No. 1020167005327, dated Feb. 11, 2019, 4 pages.
Notice of Final rejection from foreign counterpart Korean Patent Application No. 1020167005327, dated Oct. 16, 2018, 6 pages.
Notice of Last Preliminary Rejection from foreign counterpart Korean Patent Application No. 10-2016-7005327, dated Feb. 23, 2018, 12 pages.
Notification to Grant Patent Right for Invention from foreign counterpart Chinese Patent Application No. 201480047555.X, dated Sep. 12, 2018, 4 pages.
Office Action received for European Application No. 14849874.4, dated Sep. 13, 2019, 8 pages.
Office Action, in App No. 201647002519, dated Jan. 30, 2020, 6 pages.

\* cited by examiner

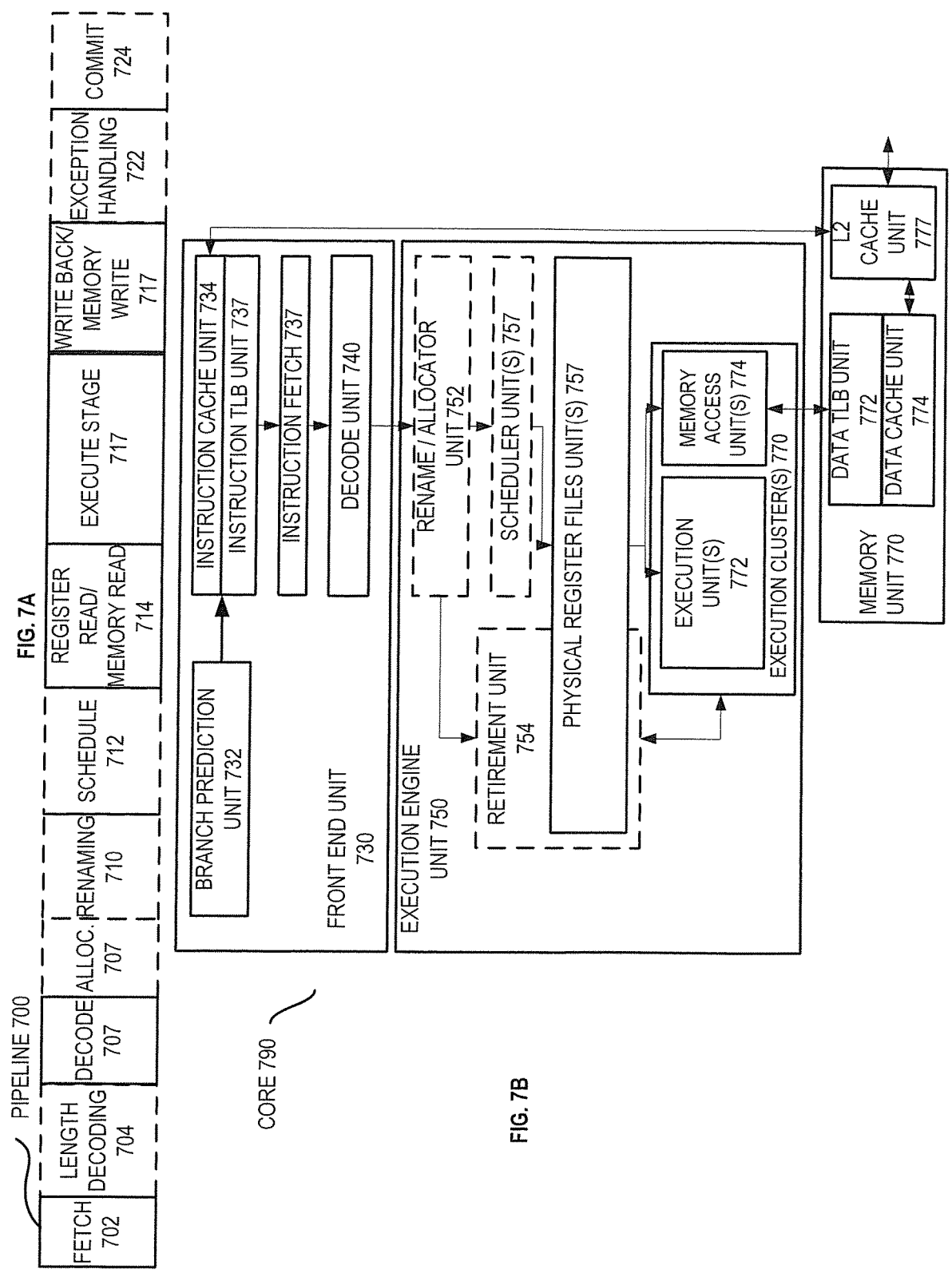

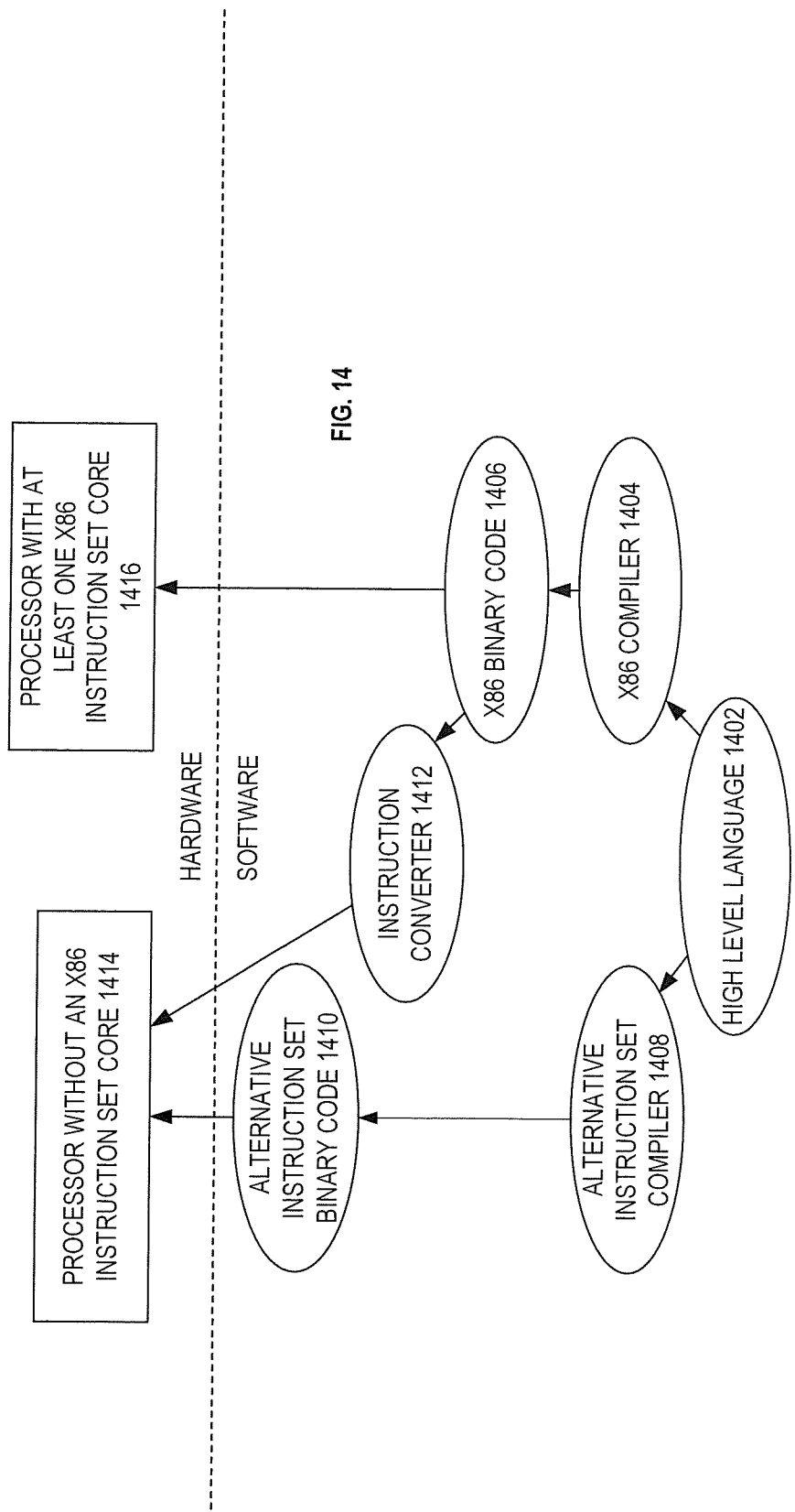

SCALABLY MECHANISM TO IMPLEMENT AN INSTRUCTION THAT MONITORS FOR WRITES TO AN ADDRESS

BACKGROUND

Technical Field

Embodiments described herein relate to processors. In particular, embodiments described herein generally relate to processors that are operable to perform an instruction that monitors for a write to an address.

Background Information

Advances in semiconductor processing and logic design have permitted an increase in the amount of logic that may be included in processors and other integrated circuit devices. As a result, many processors now have multiple to many cores that are monolithically integrated on a single integrated circuit or die. The multiple cores generally help to allow multiple software threads or other workloads to be performed concurrently, which generally helps to increase execution throughput.

One challenge in such multiple core processors is that greater demands are often placed on caches that are used to cache data and/or instructions from memory. For one thing, there tends to be an ever increasing demand for higher interconnect bandwidth to access data in such caches. One technique to help increase the interconnect bandwidth to caches involves using a distributed cache. The distributed cache may include multiple physically separate or distributed cache slices or other cache portions. Such a distributed cache may allow parallel access to the different distributed portions of the cache through a shared interconnect.

Another challenge in such multiple core processors is an ability to provide thread synchronization with respect to shared memory. Operating systems commonly implement idle loops to handle thread synchronization with respect to shared memory. For example, there may be several busy loops that use a set of memory locations. A first thread may wait in a loop and poll a corresponding memory location. By way of example, the memory location may represent a work queue of the first thread, and the first thread may poll the work queue to determine if there is available work to perform. In a shared memory configuration, exits from the busy loop often occur due to a state change associated with the memory location. These state changes are commonly triggered by writes to the memory location by another component (e.g., another thread or core). For example, another thread or core may write to the work queue at the memory location to provide work to be performed by the first thread.

Certain processors (e.g., those available from Intel Corporation, of Santa Clara, Calif.), are able to use MONITOR and MWAIT instructions to achieve thread synchronization with respect to shared memory. A hardware thread or other logical processor may use the MONITOR instruction to set up a linear address range to be monitored by a monitor unit, and arm or activate the monitor unit. The address may be provided through a general purpose register. The address range is generally of write-back caching type. The monitor unit will monitor and detect stores/writes to an address within the address range, which will trigger the monitor unit.

The MWAIT instruction may follow the MONITOR instruction in program order, and may serve as a hint to allow the hardware thread or other logical processor to stop instruction execution, and enter an implementation-dependent state. For example, the logical processor may enter a reduce power consumption state. The logical processor may remain in that state until detection of one of a set of qualifying events associated with the MONITOR instruction. A write/store to an address in the address range armed by the preceding MONITOR instruction is one such qualifying event. In such cases, the logical processor may exit the state and resume execution with the instruction following the MWAIT instruction in program order.

BRIEF DESCRIPTION OF THE DRAWINGS

The invention may best be understood by referring to the following description and accompanying drawings that are used to illustrate embodiments. In the drawings:

FIG. 7A is a block diagram illustrating both an exemplary in-order pipeline and an exemplary register renaming, out-of-order issue/execution pipeline according to embodiments of the invention.

FIG. 7B is a block diagram illustrating both an exemplary embodiment of an in-order architecture core and an exemplary register renaming, out-of-order issue/execution architecture core to be included in a processor according to embodiments of the invention.

FIG. 14 is a block diagram contrasting the use of a software instruction converter to convert binary instructions in a source instruction set to binary instructions in a target instruction set according to embodiments of the invention.

DETAILED DESCRIPTION OF EMBODIMENTS

Disclosed herein are methods, apparatus, and systems to scalably implement an instruction that monitors for writes to an address. In the following description, numerous specific details are set forth (e.g., specific instructions, instruction functionalities, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
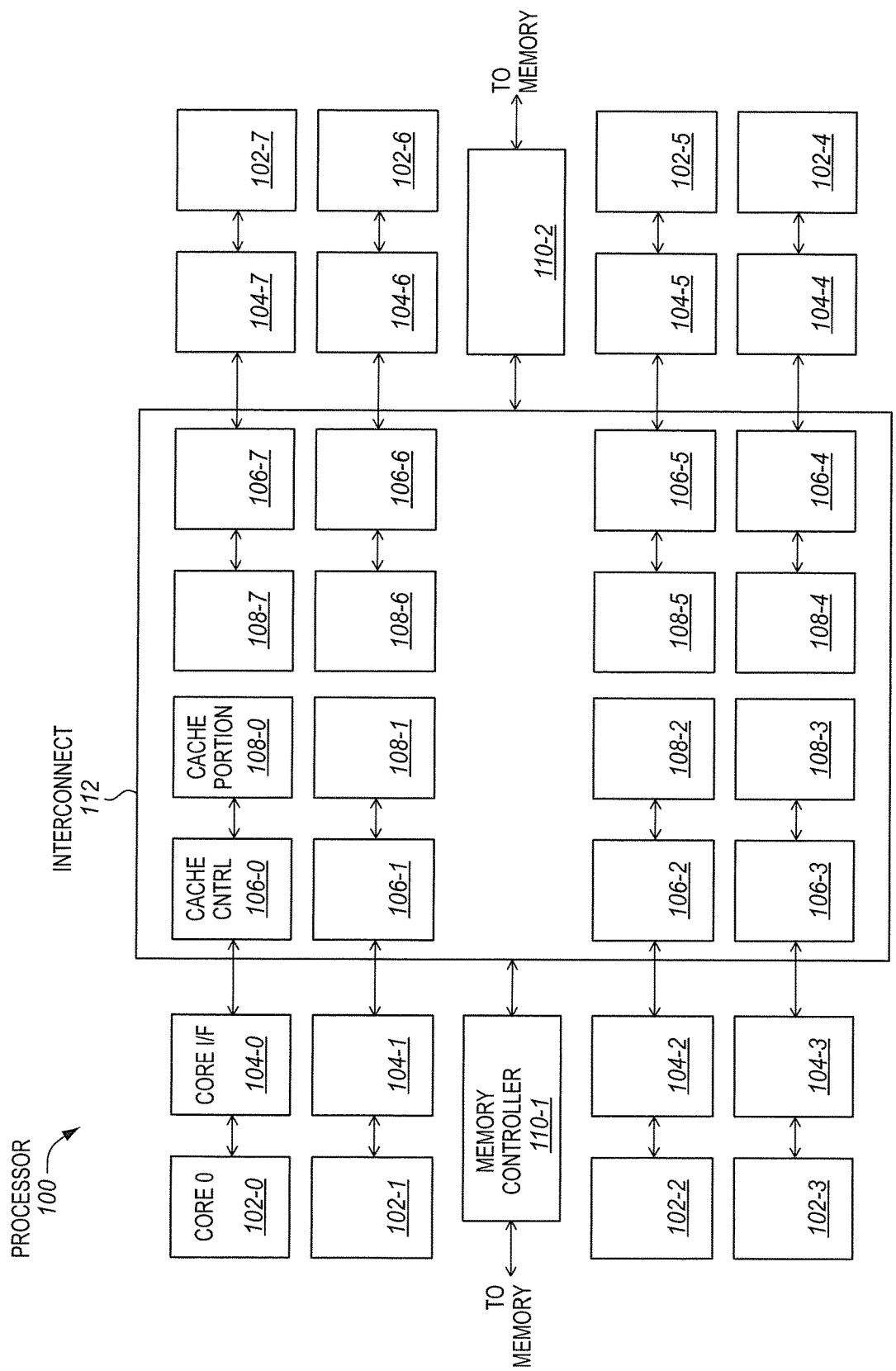
FIG. 1 is a block diagram of an embodiment of a processor.

FIG. 1 is a block diagram of an embodiment of a processor 100. The processor represents a physical processor, integrated circuit, or die. In some embodiments, the processor may be a general-purpose processor (e.g., a general-purpose microprocessor of the type used in desktop, laptop, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples. The processor may be any of various complex instruction set computing (CISC) processors, various reduced instruction set computing (RISC) processors, various very long instruction word (VLIW) processors, various hybrids thereof, or other types of processors entirely.

The processor is a multi-core processor having multiple processor cores 102. In illustrated example embodiment, the processor has eight cores including a core 0 102-0 through a core 7 102-7 (collectively cores 102). Although in other embodiments, the processor may have any other desired number of cores, for example, from two to several hundred, often from two to on the order of tens (e.g., about five to about one hundred). Each of the cores may have a single hardware thread, multiple hardware threads, or some cores may have a single hardware thread whereas other cores may have multiple hardware threads. For example, in one example embodiment, each of the cores may have at least two hardware threads, although the scope of the invention is not so limited.

The term core often refers to logic located on an integrated circuit that is capable of maintaining an independent architectural state (e.g., an execution state), in which the independently maintained architectural state is associated with dedicated execution resources. In contrast, the term hardware thread often refers to logic located on an integrated circuit that is capable of maintaining an independent architectural state, in which the independently maintained architectural state shares access to the execution resources it uses. When certain resources are shared by an architectural state, and others are dedicated to the architectural state, the line between a core and a hardware thread is less distinct. Nevertheless, the core and the hardware thread are often viewed by an operating system as individual processing elements or logical processors. The operating system is generally able to individually schedule operations on each of the cores, hardware threads, or other logical processors or processing elements. In other words, a processing element or logical processor, in one embodiment, may represent any on-die processor logic capable of being independently associated with code, such as a software thread, operating system, application, or other code whether or not the execution resources are dedicated or shared or some combination thereof. In addition to hardware threads and cores, other examples of logical processors or processing elements include, but are not limited to, thread units, thread slots, process units, contexts, and/or any other logic that is capable of holding state and being independently associated with code.

The cores 102 are coupled together by one or more on-die interconnects 112. The interconnect may be used to pass messages and data between the cores. It will be appreciate that many different types of interconnects are suitable. In one embodiment, a ring interconnect may be used. In alternative embodiments a mesh, torus, crossbar, hypercube, other interconnect structure, or a hybrid or combination of such interconnects may be used.

Each core may include a local instruction and/or data storage, such as, for example, one or more lower levels of cache (not shown). For example, each core may include a corresponding lowest-level or level 1 (L1) cache closest to the cores, and optionally a mid-level or level 2 (L2) cache next closest to the cores. The one or more lower levels of cache are referred to as lower level because they are closer physically and/or logically to their corresponding cores than higher level cache(s) (e.g., the distributed cache 108 discussed below). Each of the one or more level of cache may cache data and/or instructions.

The cores 102 may also share a distributed higher level cache 108. The distributed higher level cache may represent physically distributed memories or portions of the cache. In the illustrated example embodiment, the distributed cache includes multiple (e.g., in this case eight) physically distributed cache portions 108-0 through 108-7 (collectively cache portions 108), which are often referred to as cache slices. In other embodiments, the distributed cache may include fewer or more cache portions (e.g., a same number of distributed cache portions as the number of cores of the processor). The distributed cache portions may be shared by the different cores and/or threads. As shown, each cache portion may be more associated with and/or may optionally be more closely physically located on die with (e.g., co-located with), a respective core. For example, cache portion 108-0 may be more associated with and/or more closely physically located on die with (e.g., co-located with), core 0 102-0, as compared to the other cores.

In some embodiments, each cache portion may correspond or be mapped to a mutually exclusive or non-overlapping range of memory addresses. For example, cache portion 108-0 may have an associated first set of addresses, and cache portion 108-1 may have an associated different second set of addresses, and so on. The address ranges may be divided or apportioned among the different cache portions of the distributed cache in a variety of different ways (e.g., using different hash functions or other algorithms). In some embodiments, the higher level shared cache may represent a last level cache (LLC) operable to store data and/or instructions, although this is not required. In some embodiments, the distributed cache (e.g., the LLC) may be inclusive of all lower levels of cache in the cache hierarchy, or may be inclusive of the next to highest level of cache in the cache hierarchy (e.g., the L2 cache), although this is not required. In some embodiments, the cores may initially check the one or more lower level caches for data and/or instructions. If the sought data and/or instructions are not found in the one or more lower level caches, the cores may then proceed to check the shared distributed higher level cache.

As shown, in some embodiments, a core interface (I/F) unit 104 may be coupled with each corresponding core 102. Each core interface unit may also be coupled with the interconnect 112. Each core interface unit may be operable to serve as an intermediary between the corresponding core and the other cores, as well as between the corresponding core and the distributed cache portions. As further shown, in some embodiments, a corresponding cache control unit 106 may be coupled with each cache slice or other portion 108. In some embodiments, each cache control unit may be approximately physically co-located with the corresponding cache slice and corresponding core. Each cache control unit may be coupled with the interconnect 112. Each cache control unit may be operable to control and assist with providing cache coherency for the corresponding distributed cache portion. Each corresponding pair of core interface unit 104 and cache control unit 106 may collectively represent a core-cache portion interface unit that is operable to interface the corresponding core and the corresponding cache portion to the interconnect and/or to the other cores. The core interface units and the cache control units may be implemented in hardware (e.g., integrated circuitry, circuits, transistors, etc.), firmware (e.g., instructions stored in non-volatile memory), software, or a combination thereof.

The processor also includes a first cache coherency aware memory controller 110-1 to couple the processor with a first memory (not shown), and a second cache coherency aware memory controller 110-2 to couple the processor with a second memory (not shown). In some embodiments, each cache coherency aware memory controller may include home agent logic that is operable to perform cache coherency and second memory controller logic that is operable to interact with the memory. For simplicity, in the present description, such a home agent and memory controller functionalities will be referred to as a cache coherency aware memory controller. Other embodiments may include fewer or more cache coherency aware memory controllers. Moreover, while in the illustrated embodiment, the cache coherency aware memory controllers are on-die or on-processor, in other embodiments they may instead be off-die or off-processor (e.g., as one or more chipset components).

It is to be appreciated that the processor may also include other components not necessary for understanding the various embodiments herein. For example, the processor may optionally include one or more of an interface to an input and/or output device, a system interface, a socket-to-socket interconnect, or the like.

As mentioned above, certain processors (e.g., those available from Intel Corporation) are able to use MONITOR and MWAIT instructions to achieve thread synchronization with respect to shared memory. A hardware thread or other logical processor may use the MONITOR instruction to set up a linear address range to be monitored by a monitor unit, and arm or activate the monitor unit. The address may be provided through though a general purpose register (e.g., EAX). The address range is generally of write-back caching type. The monitor unit will monitor and detect stores/writes to an address within the address range, which will trigger the monitor unit. Other general purpose registers (e.g., ECX and EDX) may be used to communicate other information to the monitor unit. The MWAIT instruction may follow the MONITOR instruction in program order, and may serve as a hint to allow the hardware thread or other logical processor to stop instruction execution, and enter an implementation-dependent state. For example, the logical processor may enter a sleep state, a power C-state, or other reduced power consumption state. The logical processor may remain in that state until detection of one of a set of qualifying events associated with the MONITOR instruction. A write/store to an address in the address range armed by the preceding MONITOR instruction is one such qualifying event. In such cases, the logical processor may exit the state and resume execution with the instruction following the MWAIT instruction in program order. General purpose registers (e.g., EAX and ECX) may be used to communicate other information to the monitor unit (e.g., information about the state to enter).

Figure 2:
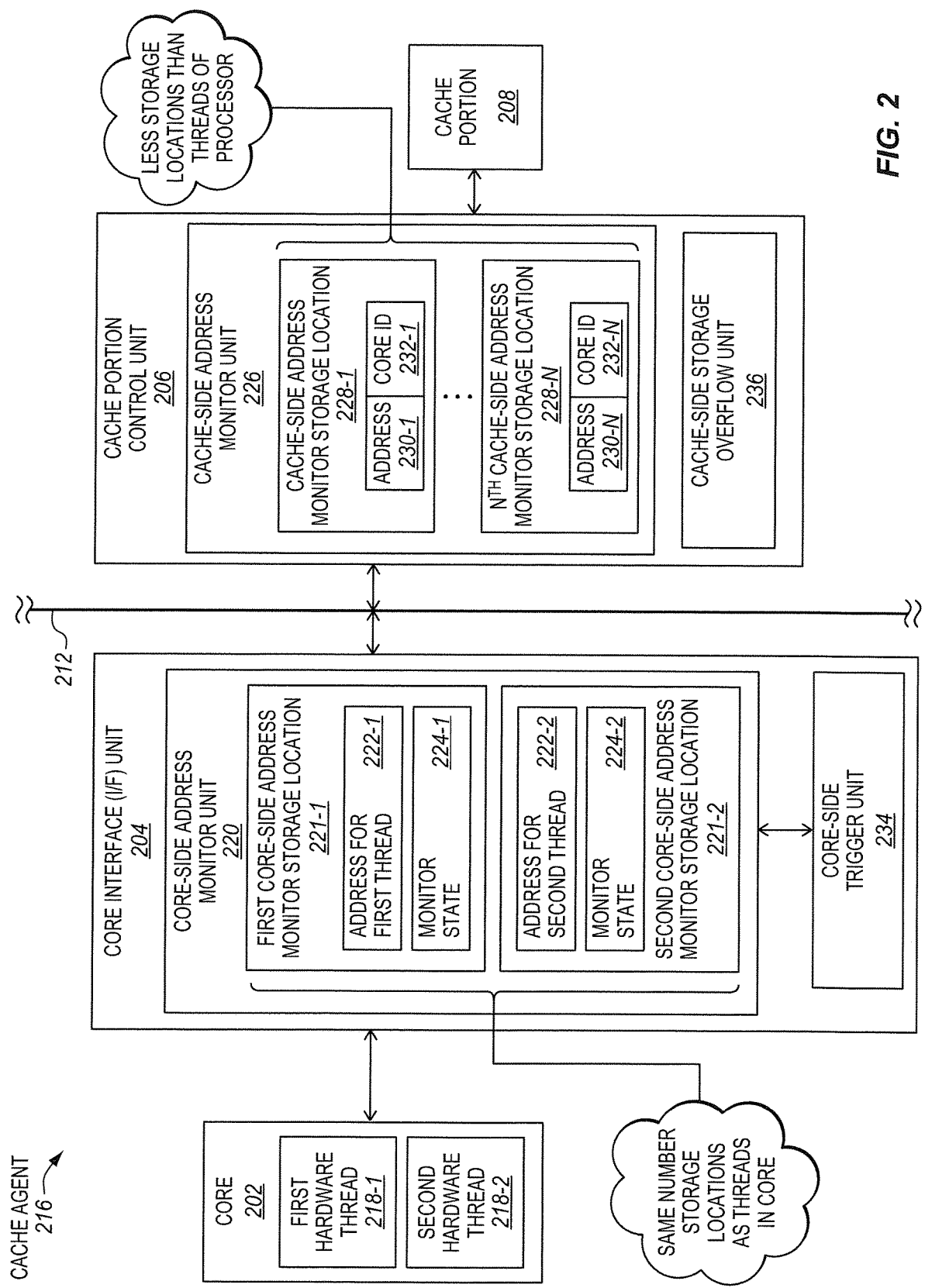
FIG. 2 is a block diagram of an embodiment of a cache agent.

FIG. 2 is a block diagram of an embodiment of a cache agent 216. In some embodiments, the cache agent may be used in the processor of FIG. 1. However, it is to be appreciated that the cache agent of FIG. 2 may be used with different processors than that of FIG. 1.

The cache agent 216 includes a core 202 and a cache portion 208. In some embodiment, the core may be one of multiple cores of a multi-core processor. In some embodiments, the cache portion may be one of multiple cache slices or other cache portions of a distributed cache (e.g., a distributed LLC). The cache agent also includes a core interface unit 204 and a cache portion control unit 206. The core is coupled with an interconnect 212 through the core interface unit. The cache portion is coupled with the interconnect through the cache portion control unit. The core interface unit is coupled between the core and the cache portion control unit. The cache portion control unit is coupled between the core interface and the cache portion. The core, the cache portion, the core interface unit, and the cache portion control unit, may optionally be similar to, or the same as, the correspondingly named components of FIG. 1. In this particular example, the core is a multi-threaded core that includes a first hardware thread 218-1 and a second hardware thread 218-2, although the scope of the invention is not so limited. In other embodiments, the core may be either single threaded or may have more than two hardware threads.

The cache agent 216 includes a monitor mechanism operable to implement a monitor instruction (e.g., the MONITOR instruction) that is used to monitor for a write to one or more addresses (e.g., an address range indicated by the MONITOR instruction). The mechanism may utilize or leverage an existing cache coherency mechanism (e.g., may utilize a communication of an intention to write to an address conveyed through the cache coherency mechanism). In the illustrated embodiment, the monitor mechanism includes a cache-side address monitor unit 226, a core-side address monitor unit 220, a core-side trigger unit 234, and a cache-side storage overflow unit 236. As used herein, the term "core-side" refers to being on the same side of interconnect 212 as the core 202 and/or being disposed between the core and the interconnect and/or being logically closer to the core than the cache portion. Likewise, the term "cache-side" refers to being on the same side of interconnect 212 as the cache portion 208 and/or being disposed between the cache portion and the interconnect and/or being logically closer to the cache portion than the core.

In the illustrated embodiment, the cache-side address monitor unit 226 and the cache-side storage overflow unit 236 are both implemented in the cache portion control unit 206, although this is not required. In other embodiments, one or more of these units may be implemented as a separate cache-side component (e.g., coupled with the cache control unit and/or with the cache portion). Similarly, in the illustrated embodiment, the core-side address monitor unit 220 and the core-side trigger unit 234 are both implemented in the core interface unit 204, although this is not required. In other embodiments, one or more of these units may be implemented as a separate core-side component (e.g., coupled with the core interface unit and/or with the core).

The cache-side address monitor unit 226 corresponds to the cache portion 208, which is a slice or other portion of a distributed cache. The cache-side address monitor unit has multiple different cache-side address monitor storage locations 228. As shown, each cache-side address monitor storage location may be used to store an address 230 to be monitored for writes. In some embodiments, each cache-side address monitor storage location may also store an indication of a core pertaining to the address (e.g., a core identifier, a core mask with a different bit corresponding to each different core, etc.). By way of example, these storage locations may represent different entries in a hardware implemented table. As shown, in the illustrated embodiment, there may be a first cache-side address monitor storage location 228-1 through an Nth cache-side address monitor storage location 228-N, where N may be a number appropriate for the particular implementation.

In some embodiments, the total number of cache-side address monitor storage locations in the cache-side address monitor unit corresponding to the cache portion may be less than a total number of hardware threads (or other logical processors) of the processor and/or socket in which the processor is implemented. In some embodiments, each hardware thread (or other logical processor) may be operable to use a monitor instruction (e.g., the MONITOR instruction) to monitor a single address or single range of addresses. In some cases, after using such a monitor instruction, the hardware thread may be put to sleep or put in another reduce power consumption state. One possible approach would be to provide enough cache-side address monitor storage locations 228 for each hardware thread (or other logical processor) to store an address to be monitored. However, when a distributed cache is used, each address may hash or otherwise map to only a single corresponding cache slice or other cache portion. For example, a hash of the address may select the single corresponding cache slice corresponding to that address according to the particular hash function. Accordingly, when such a distributed cache is used, there is a chance, albeit generally a very small chance, that all of the addresses to be monitored for all of the hardware threads (or other logical processors) may all be hashed or otherwise mapped to the same single cache slice.

In order to allow for such a possibility, one possible approach would be to provision each cache portion with a number of cache-side address monitor storage locations 228 that is equal to a total number of hardware threads (or other logical processors) of the processor and/or socket. For example, in an eight core processor where each core has two hardware threads, a total of sixteen cache-side address monitor storage locations (i.e., the number of cores multiplied by the number of threads per core) may be provided for each of the eight cache slices. By way of example, a hardware implemented table with a number of entries equal to the total number of hardware threads may be included. In some cases, each storage location may have a fixed correspondence or assignment to a corresponding hardware thread. This may allow every hardware thread to store an address to be monitored and may allow for the possibility that all of these addresses may possibly map to the same cache portion and would therefore need to be stored locally for that cache portion. Such an approach essentially designs for the worst case scenario, which is generally quite unlikely, but which heretofore could not be ignored, since no approach was available to handle the scenario if it did happen to occur.

One drawback to such an approach is that it tends to be relatively un-scalable as the number of hardware threads (or other logical processors) and/or the number of cache portions increase. Increasing the number of hardware threads increases the number of storage locations needed for each cache portion. Moreover, increasing the number of cache portions involves adding an additional set of such storage locations for each additional cache portion. Processors may have more than 32 threads, 36 threads, 40 threads, 56 threads, 128 threads, or 256 threads, to name just a few examples. One can readily see that when such large numbers of threads are used the amount of storage can become quite significant. Such substantial amounts of storage tend to increase the manufacturing cost of the processor, the amount of area on-die needed to provision the storage, and/or the power consumption incurred by the storage.

As an alternate approach, in some embodiments, the total number of cache-side address monitor storage locations 228 in the cache-side address monitor unit 226 corresponding to the cache portion 208 may be less than a total number of hardware threads (or other logical processors) of the processor and/or socket. There may be less address monitor storage locations than the number strictly needed to totally avoid the possibility of address monitor storage overflow. In some embodiments, each cache portion may have associated therewith a number of address monitor storage locations that is sufficient to avoid overflow most of the time, but which is insufficient to completely prevent such overflow in all instances. In some embodiments, the total number of cache-side address monitor storage locations per cache portion may be enough relative to the total number of hardware threads of the processor that a likelihood of overflow is no more than about one in one hundred thousand, about one in one million, or about one in ten million, as desired. In some embodiments, the processor may have more than about forty hardware threads, and the total number of the cache-side address monitor storage locations per cache portion may be less than forty (e.g., from about 20 to about 38). In some embodiments, the processor may have more than fifty hardware threads, and the total number of the cache-side address monitor storage locations per cache portion may be less than about fifty (e.g., from about 20 to about 45, or from about 25 to about 40, or from about 30 to about 40). In some embodiments, instead of designating or assigning the cache-side address monitor storage locations to particular hardware threads, the storage locations may not correspond to any particular hardware thread, but rather any storage location may be used by any hardware thread. Advantageously, using a total number of cache-side address monitor storage locations in the cache-side address monitor unit corresponding to the cache portion that is less than a total number of hardware threads (or other logical processors) of the processor and/or socket may potentially help to provide a more scalable solution to implement monitor instructions (e.g., the MONITOR instruction). However, it is to be appreciated that the embodiments disclosed herein have utility regardless of the number of hardware threads and/or cores and/or whether or not the total amount of storage is large or small.

Referring again to FIG. 2, the cache agent includes a core-side address monitor unit 220, which corresponds to the core 202. The core-side address monitor unit has a same number of core-side address monitor storage locations as a number of one or more hardware threads of the corresponding core. In the illustrated embodiment, a first core-side address monitor storage location 221-1 has a fixed correspondence to a first hardware thread 218-1, and a second core-side address monitor storage location 221-2 has a fixed correspondence to a second hardware thread 218-2. In other embodiments, other numbers of threads and storage locations may be used. Each core-side address monitor storage location may be operable to store an address 222-1, 222-2 to be monitored for the corresponding hardware thread 218-1, 218-2 of the corresponding core. When there is such a fixed correspondence, storing the address in the storage location may associate the address with the hardware corresponding hardware thread. In other embodiments, if there is not a fixed correspondence between storage locations and hardware threads, then each storage location may be used to store an indication of the hardware thread (e.g., a hardware thread identifier) corresponding to the address to be monitored. In some embodiments, each core-side address monitor storage location may also be operable to store a monitor state 224-1, 224-2 for the corresponding hardware thread 218-1, 218-2 of the corresponding core. In some embodiments, each monitor state may represent a monitor finite state machine (FSM). In some embodiments, in the case of the MONITOR instruction, the monitor state may be any one of an idle state, a speculative (e.g., monitor loaded) state, and a trigger ready (e.g., wait2trigger) state, although the scope of the invention is not so limited.

In some embodiments, the cache-side address monitor unit 226 and the core-side address monitor unit 220 may cooperate or work together to monitor for writes to one or more addresses (e.g., an address in an address range indicated by a MONITOR instruction). To further illustrate certain concepts, consider an example of how the monitor mechanism may perform the MONITOR and MWAIT instructions. The first hardware thread 218-1 may perform the MONITOR instruction. The MONITOR instruction may indicate an address to be monitored for a write. The first hardware thread may issue a corresponding MONITOR request for the indicated monitor address. The MONITOR request may cause the first core-side address monitor unit 220 to store the indicated monitor address 222-1 in the first core-side address monitor storage location 221-1. The monitor state 224-1 may be set at a speculative or monitor loaded state. The MONITOR request may be routed on the interconnect 212 to the appropriate distributed cache portion 208 supposed to store data corresponding to the indicated monitor address. It is noted that depending on the particular indicated monitor address it may be any of the distributed cache portions based on the hash function or other algorithm used for the mapping. The cache-side address monitor unit may store the indicated monitor address in a cache-side address monitor storage location 230 (e.g., any available one of locations 230-1 though 230-N). A core identifier identifying the core 202 having the first hardware thread 218-1 may also be stored in the cache-side address monitor storage location 230 as a core identifier (ID) 232. In some embodiments, the core identifier may be a set of bits to identify one of the cores. In other embodiments, a core mask may optionally be used so that a single storage location may be shared by multiple cores for the same address being monitored.

The first thread 218-1 may subsequently perform an MWAIT instruction that may also indicate the monitored address. The first hardware thread may issue a corresponding MWAIT signal for the indicated monitor address. In response to the MWAIT signal the core side address monitor unit 220 may set the monitor state 224-1 at a ready to trigger state (e.g., a wait-to-trigger state). The first hardware thread may optionally be put in a different state, such as, for example, a sleep or other reduced power consumption state. Representatively, the first thread may store its state in a context if the thread is to go to sleep and then go to sleep.

Subsequently, when there is an intent to write to the indicated monitor address (e.g., a read for ownership request, a snoop invalidate implicating the indicated monitor address, a state transition associated with the address changing from a shared state to an exclusive state, etc.), the cache-side address monitor unit may detect such an intent to write to the address. The address may match one of the addresses in one of its storage locations. The one or more cores corresponding to the storage location may be determined, for example, by the core identifier or core mask stored in the cache-side address monitor storage location. The cache-side address monitor unit may clear the cache-side address monitor storage location used to store the indicated monitor address. It may also signal the corresponding core(s), for example, by sending a snoop invalidate to the corresponding core(s). The cache-side address monitor unit may serve as a sort of advanced filter to help direct a notification of an intent to write to an address (e.g., through a request for ownership or snoop invalidate) selectively only toward those one or more cores known to be monitoring that address. These notifications may represent "hints" that are provided selectively to a subset of the cores monitoring the address. Advantageously, this may help to avoid notifying cores that are not monitoring the address, which may help to avoid false wakeups and/or reduce traffic on the interconnect.

The core-side address monitor unit 220 at the core(s) signaled may receive the signal and may compare the address indicated in the signal (e.g., in the snoop invalidate) with the monitor addresses in its core-side address monitor storage locations. It may determine that the address of the signal matches the monitor address 222-1 in the first core-side monitor address storage location 221-1 corresponding to the first hardware thread 218-1. The core-side address monitor unit may know the first hardware thread corresponds to the address being monitored. The core-side address monitor unit may signal the core side trigger unit 234 that the intent to write to the monitored address has been observed. It may clear the first core-side address monitor storage location, and change the monitor state 224-1 to idle. The core-side trigger unit may be operable to provide a trigger signal (e.g., an alert, notification, or wake signal) to the first hardware thread. In this embodiment, the core-side trigger unit is core-side, which may help to simply the logic, although it may also optionally be provided cache-side. The first hardware thread, if it was asleep, may be woken.

In some embodiments, there is the possibility that the cache-side address monitor storage locations may overflow. For example, a new monitor request may be received at the cache-side address monitor unit, but all of the cache-side address monitor storage locations may currently be in use such that there is no empty/available cache-side address monitor storage location to store the address of the new monitor request. As shown, in some embodiments, the cache-side address monitor unit may be coupled with a cache-side address monitor storage overflow unit 236 which corresponds to the cache portion. In some embodiments, the cache-side address monitor storage overflow unit may be operable to enforce or implement an address monitor storage overflow policy when there are no empty/available/unused cache-side address monitor storage locations available to store an address of a new monitor request.

As mentioned, in some embodiments, the core-side address monitor unit may have the same number of core-side address monitor storage locations as the number of hardware threads in its corresponding core. Similarly, in some embodiments the core-side address monitor units of other cores may have the same number of core-side address monitor storage locations as the number of hardware threads in their corresponding cores. Collectively these core-side address monitor storage locations may represent one set of as many core-side address monitor storage locations as the total number of hardware threads (or other logical processors) of the processor. Advantageously, even when there is an overflow of cache-side address monitor storage locations, the core-side address monitor units still have enough core-side address monitor storage locations to store all of the monitored addresses for all hardware threads (or other logical processors).

Figure 3:
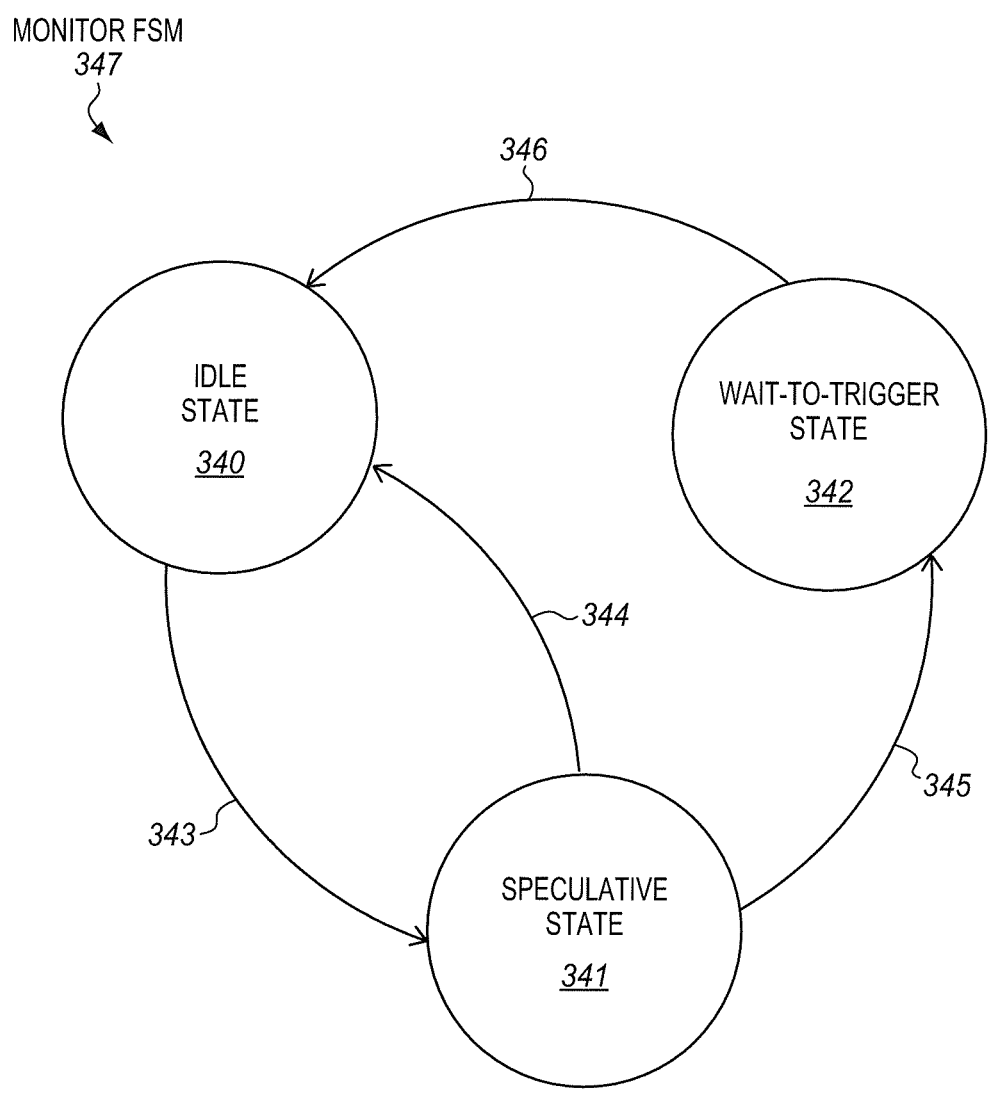
FIG. 3 is a diagram illustrating states of an embodiment of a monitor finite state machine.

FIG. 3 is a diagram illustrating states of an embodiment of a monitor finite state machine (FSM) 347 suitable for implementing a MONITOR instruction and an MWAIT instruction. Upon receiving a monitor request for an address from an execution thread, the monitor FSM may make a transition 343 from an idle state 340 to a speculative state 341. If the cache portion that is to store data corresponding to that address receives a write request matching the address, or if a monitor clear request is provided from the execution thread, while monitor FSM is in the speculative state, the monitor FSM may make a transition 344 back to the idle state 340. If another monitor request is provided from that same execution thread, the monitor FSM may make transition 343 returning to the speculative state 341, and the monitored address may be adjusted if appropriate. On the other hand, if an MWAIT request is provided from that execution thread while in the speculative state 341, the monitor FSM may make a transition 345 to a wait-to-trigger state 342. The speculative state may help to ensure that monitor-wake events are sent only for the most recent monitored address, while tracking addresses from the time a monitor request is received, even before receiving an MWAIT request. If the cache portion that is to store data corresponding to that address receives a write request matching the monitored address while monitor FSM is in the wait-to-trigger state, a monitor-wake event may be sent to the execution thread. On the other hand, a monitor clear request may be provided from the execution thread while monitor FSM is in the wait-to-trigger state 342. In such a case the monitor request may be erased for that execution thread and no monitor-wake event needs to be sent to the execution thread, but in either of these two cases, the monitor FSM may make transition 346 back to the idle state 340.

Figure 4:
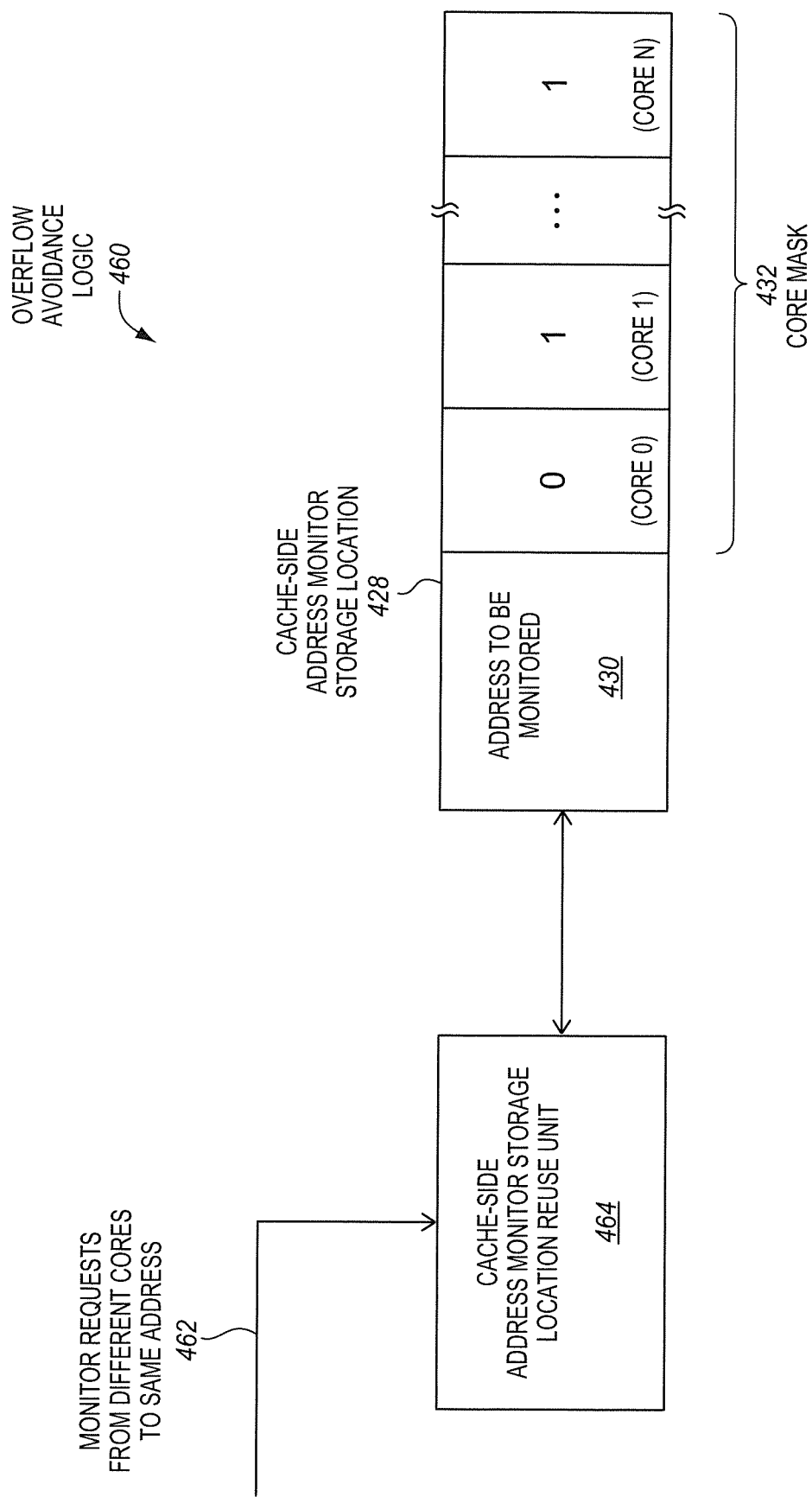
FIG. 4 is a block diagram of an embodiment of overflow avoidance logic that is operable to reuse a single cache-side address monitor storage location for multiple hardware threads and/or cores when monitor requests indicate the same address.

FIG. 4 is a block diagram of an embodiment of overflow avoidance logic 460 that is operable to reuse a single cache-side address monitor storage location 428 for multiple hardware threads and/or cores when monitor requests indicate the same address. The logic includes a cache-side address monitor storage location reuse unit 464 coupled with the cache-side address monitor storage location 428. The cache-side address monitor storage location reuse unit may receive monitor requests 462 from different hardware threads and/or cores indicating the same address. One possible approach would be to store different copies of this same address in different cache-side address monitor storage locations (e.g., different entries in a hardware implemented table). However, this may consume multiple, or in some cases many, cache-side address monitor storage locations.

As an alternate approach, in some embodiments, a single cache-side address monitor storage location 428 may be used to store the address 430 to be monitored and represent the monitor requests from the different hardware threads. In some embodiments, a structure 432 capable of associating multiple cores with the address to be monitored is also stored in the cache-side address monitor storage location 428. In one example, the structure may include a core mask structure 432. The core mask may have a same number of bits as the total number of cores of the processor, and each bit of the core mask may have a fixed correspondence to a different core. According to one possible convention, each bit may have a first value (e.g., be cleared to binary 0) to indicate that the corresponding core does not have a pending monitor request for the address, or a second value (e.g., be set to binary 1) to indicate that the corresponding core has a pending monitor request for the address. The opposite convention is also possible. A bit for a corresponding core may be set to indicate that a monitor request has been received from that core for the address stored in the cache-side address monitor storage location, or cleared when the write to the address is observed and reported to the core-side logic. Notice that the cache-side address monitor storage location is tracked by address not by thread identifier. Advantageously, in this way, monitor requests for the same address from different cores may be collapsed into the same single cache-side address monitor storage location. Such reuse of a storage location for multiple requests from different threads/cores may help to avoid cache-side address monitor storage location overflow.

As mentioned above, it is possible in some instances to overflow the limited number of cache-side address monitor storage locations. In some embodiments, an overflow mode or set of policies may be provided to allow the monitor mechanism to operate correctly even in the event of overflow.

Figure 5:
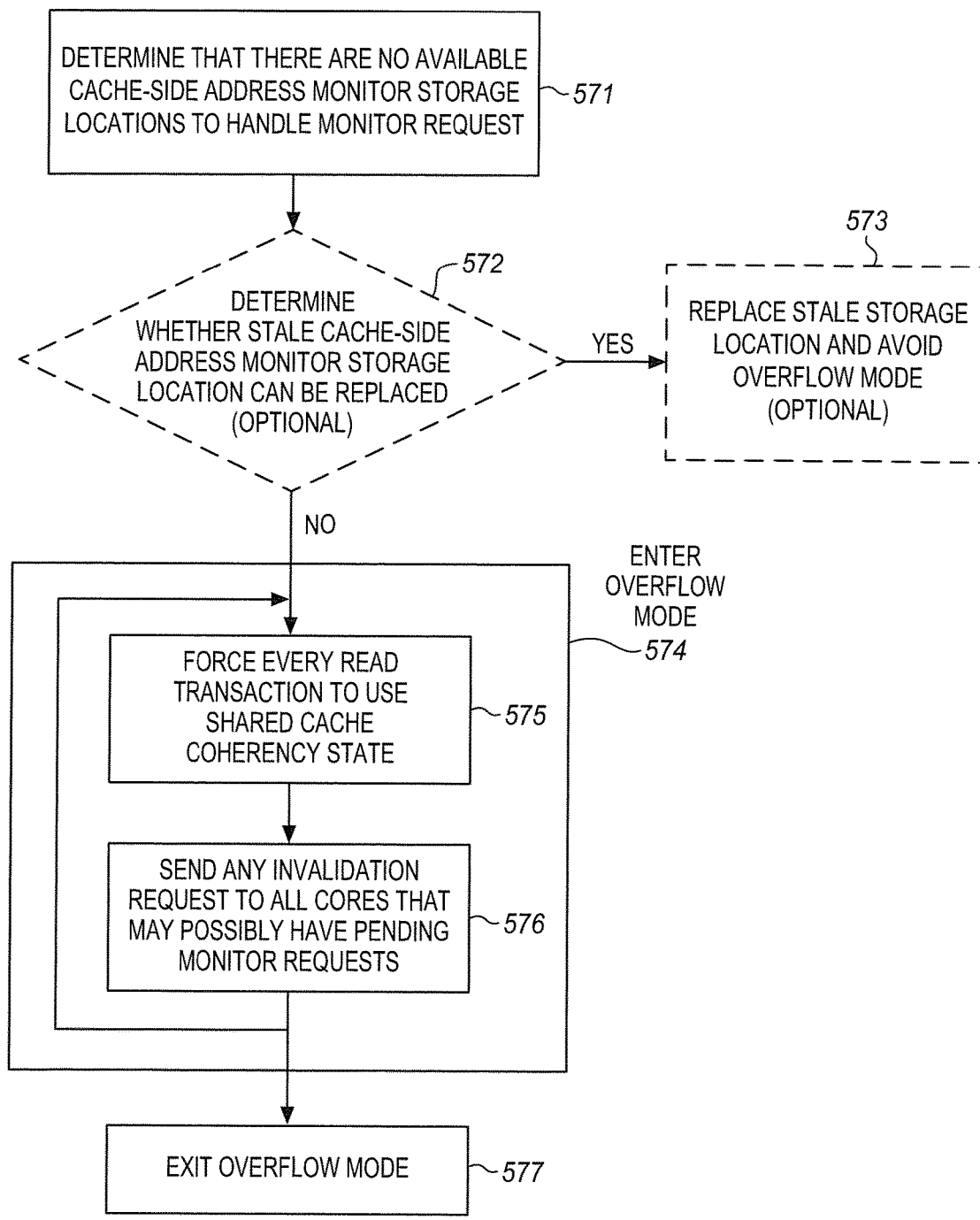
FIG. 5 is a block flow diagram of an embodiment of a method of optionally attempting to avoid an overflow mode by checking for stale/outdated cache-side address monitor storage locations, and entering the overflow mode when no such stale/outdated storage locations are found.

FIG. 5 is a block flow diagram of an embodiment of a method 570 of optionally attempting to avoid an overflow mode by checking for stale/outdated cache-side address monitor storage locations, and entering the overflow mode when no such stale/outdated storage locations are found. In some embodiments, the operations and/or method of FIG. 5 may be performed by and/or within the processor of FIG. 1 and/or the cache agent of FIG. 2. The components, features, and specific optional details described herein for the processor of FIG. 1 and/or the cache agent of FIG. 2 also optionally apply to the operations and/or method of FIG. 5. Alternatively, the operations and/or method of FIG. 5 may be performed by and/or within a similar or different processor and/or cache agent. Moreover, the processor of FIG. 1 and/or the cache agent of FIG. 2 may perform operations and/or methods the same as, similar to, or different than those of FIG. 5.

The method optionally includes determining that there are no available/unused cache-side address monitor storage locations to handle a received monitor request, at block 571. For example, a monitor request may be received at a cache-side address monitor unit (e.g., the cache-side address monitor unit 226), and the cache-side address monitor unit may determine that there are no available/unused cache-side address monitor storage location to handle the monitor request. For example, all of the cache-side address monitor storage locations may presently store an address to be monitored.

The method optionally includes determining whether a stale/outdated cache-side address monitor storage location exists, and can be used to handle with the newly received monitor request, at block 572. In some embodiments, the cache-side address monitor unit may select an entry having an address and determine if it is stale and/or outdated. By way of example, a stale/outdated address may represent an address that is still stored in a storage location but there presently are not any valid pending monitor requests for that address. For example, there can be cases of false monitor requests, for example, due to a monitor being set but not armed. The entry may be selected at random, based on the age of the entry, based on a prediction of validity, or otherwise. In some embodiments, in order to check whether the storage location is stale/outdated, the cache-side address monitor unit may send a snoop request for the associated address to one or more cores indicated to have monitor requests for the address (e.g., determined based on the core identifier or core mask stored in the storage location). The one or more core-side address monitor unit(s) for the core(s) receiving the snoop request may check their corresponding core-side address monitor storage locations to determine if the address is stored. Then each of the one or more core-side address monitor unit(s) may send a response back to the cache-side address monitor unit indicating whether the address is still valid (e.g., still corresponds to a valid monitor request from the corresponding core). If the responses from the one or more core-side address monitor units indicate any such valid still pending monitor requests for that address, then the address and/or storage location may be determined not to be stale/outdated. Otherwise, if no core-side address monitor unit reports a valid still pending monitor request for that address, then the address and/or storage location may be determined to be stale/outdated. In some embodiments, only a single storage location and/or address may be checked using such an approach. Alternatively, multiple storage locations and/or addresses may be checked using such an approach.

Referring again to FIG. 5, if at block 572 it is determined that there is such a stale/outdated cache-side address monitor storage location that can be used to handle the newly received monitor request (i.e., "yes" is the determination at block 572), then the method may optionally advance to block 573. At block 573, the stale/outdated cache-side address monitor storage location may optionally be used to handle the newly received monitor request. Advantageously, in this case the overflow mode may be avoided at this point by utilizing the stale/outdated storage location.

Alternatively, if at block 572 it is determined that there is not such a stale/outdated cache-side address monitor storage location (i.e., "no" is the determination at block 572), then the method may advance to block 574. At block 574, the method may enter the overflow mode. Entering the overflow mode may include enforcing or implementing overflow policies. In the overflow mode performance may be degraded somewhat. However, often the overflow mode only needs to be implemented rarely and usually only for relatively short periods of time until the overflow condition is alleviated.

As one overflow policy, at block 575, the method may include forcing every read transaction to use a shared cache coherency state. Conceptually this may be regarded as treating every read transaction as a monitor request. Upon entering the overflow mode, the cache-side address monitor unit is no longer capable of tracking the monitor requests/addresses with dedicated storage. Accordingly, no core may be allowed to have an exclusive copy of a cacheline. For example, any read operation received by the cache-side address monitor unit may be handled with a shared state response. Forcing such read transactions to use a shared state may help to ensure that an intent to write to the corresponding address will cause a snoop or broadcast to be provided to all of the cores that may have cached the address.

As another overflow policy, at block 576, the method includes sending any invalidation request to all cores that may possibly have pending monitor requests. In some embodiments, this may include snoop invalidating all cores of the processor and/or within the same socket that may possibly have pending monitor requests when any invalidation request is detected (e.g., through detection of a read invalidate own request, a snoop invalidate request, or the like). Upon entering overflow mode, the cache-side address monitor unit is no longer capable of tracking the monitor requests/addresses with dedicated storage. Accordingly, all cores that may possibly have pending monitor requests should be informed on every invalidation request. The snoop may reach the core-side address monitor units of all such cores and provide monitor triggers when appropriate to any cores for which there is a valid pending monitor request for the associated address.

It is worth noting that it is not strictly required to notify all cores of the processor, but rather just all cores that may possibly have pending monitor requests. In some embodiments, a structure may optionally be used to keep track of all cores that may possibly have pending monitor requests when overflow occurs. One example of such a structure is an optional overflow structure. The overflow structure may indicate which cores may possibly have pending monitor requests when overflow occurs. In one example, an overflow structure may have a same number of bits as a total number of cores of the processor, and each bit may have a fixed correspondence to a different corresponding core. According to one possible convention, each bit may have a first value (e.g., be set to binary one) to indicate that the corresponding core may possibly have a pending monitor request when overflow occurs, or may have a second value (e.g., be cleared to binary zero) to indicate that the corresponding core does not possibly have a pending monitor request when the overflow occurs.

In one embodiment, the overflow structure by itself may reflect all of the cores that may possibly have pending monitor requests when overflow occurs. For example, when overflow occurs the overflow structure may be modified to reflect all cores corresponding to any one or more addresses presently stored in the cache-side address monitor storage locations. In another embodiment, the overflow structure in combination with the cache-side address monitor storage locations may reflect all of the cores that may possibly have pending monitor requests when overflow occurs. For example, when overflow occurs, each time a cache-side address monitor storage location is overwritten or consumed by a newly received monitor request, the cores associated with the addresses that are overwritten or consumed may be reflected in the overflow structure. That is, the overflow structure may be updated each time a storage element is overwritten to capture the information about cores that may possibly have pending monitor requests. In such embodiments, the information about which cores may possibly have pending monitor requests when overflow occurs is divided between the cache-side address monitor storage locations and the overflow structure.

In embodiments where such an overflow structure or related structure is used, it is not required to send any received invalidation request to all cores, but rather just those cores indicated by the overflow vector and/or the storage locations that may possibly have pending monitor requests. Some cores may not be indicated in the overflow vector and/or the storage locations and therefore should not possibly have any pending monitor requests when overflow occurs and therefore do not need to be sent the invalidation requests. However, use of such an overflow structure is optional not required.

Referring again to FIG. 5, the overflow mode may continue by repeating blocks 575 and 576 as needed as long as there are no available storage locations. However, over time stale/outdated addresses and/or storage locations may be actively removed by snooping or otherwise sending any invalidation requests to all cores that may possibly have pending monitor requests at block 576. If the core-side address monitoring units doesn't have valid pending monitor requests for the snoops or invalidation request then they may report back about this, which may allow the cache-side address monitor unit to reflect that the core is not interested in monitoring the address (e.g., update the core mask), or clear the storage location if no other cores are interested in the address. In various embodiments, the removal of stale/outdated storage locations may be performed based on a particular address, a particular cache portion, a particular core, or the like. The overflow mask may also be modified to reflect the cleaning up of stale/outdated storage locations or addresses. For example, cores that no longer have pending monitor requests may be updated to zeros instead of ones in the overflow mask. In this way the snoops or invalidation requests at block 576 may help to clean up stale/outdated storage elements or addresses over time so that the overflow mode can be exited at some point. As shown at block 577, the overflow mode may be exited.

This is just one illustrative embodiment. Many variations on this embodiment are contemplated. For example, the determination at block 572 is optional and not required. In other embodiments, the overflow mode may be entered automatically without a check for a possible stale entry/address.

Figure 6:
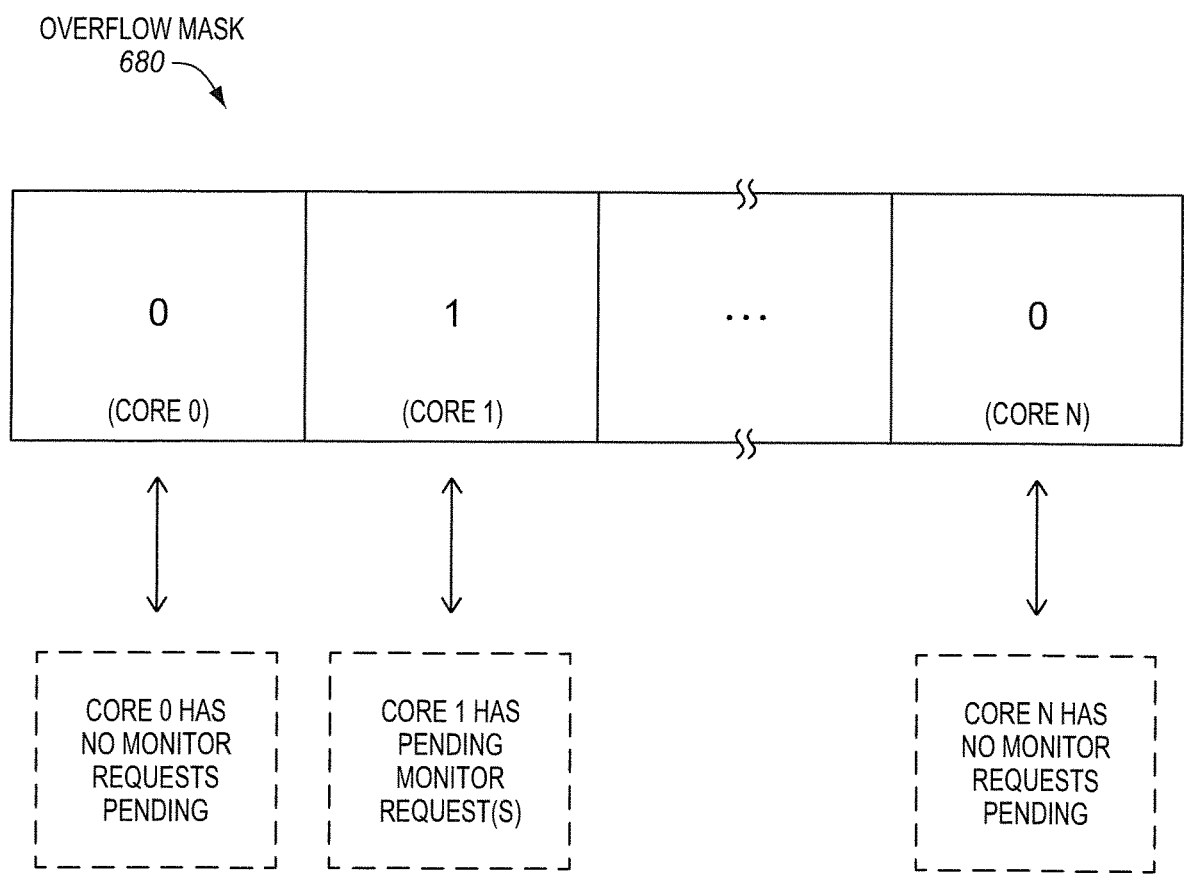
FIG. 6 is a block diagram of an embodiment of an overflow structure.

FIG. 6 is a block diagram of an embodiment of an overflow structure 680. The overflow structure may be used indicate, either alone or in combination with the set of cache-side address monitor storage locations, which cores may possibly have pending monitor requests when overflow occurs. In this embodiment, the overflow structure includes N+1 bits each having a fixed correspondence to a different one of N+1 cores (e.g., core0 through core N). According to one possible convention, each bit may have a first value (e.g., be set to binary one) to indicate that the corresponding core may possibly have a pending monitor request when overflow occurs, or may have a second value (e.g., be cleared to binary zero) to indicate that the corresponding core does not possibly have a pending monitor request when the overflow occurs. For example, in the illustration, the leftmost bit corresponding to core0 has a binary zero (i.e., 0) to indicate that core0 has no pending monitor requests, the next leftmost bit corresponding to core1 has a binary one (i.e., 1) to indicate that core1 has a pending monitor request, and the rightmost bit corresponding to coreN has a binary zero (i.e., 0) to indicate that coreN has no monitor requests pending. This is just one illustrative example of a suitable overflow structure. It is to be appreciated that other structures may be used to convey the same or similar types of information. For example, in another embodiment, a list of core IDs with pending monitor requests may be stored in a structure, etc.

The monitor mechanisms disclosed herein, as well as any of the units or components thereof, may be implemented in hardware (e.g., integrated circuitry, transistors or other circuit elements, etc.), firmware (e.g., ROM, EPROM, flash memory, or other persistent or non-volatile memory and microcode, microinstructions, or other lower-level instructions stored therein), software (e.g., higher-level instructions stored in memory), or a combination thereof (e.g., hardware potentially combined with one or more of firmware and/or software).

Components, features, and details described for any of FIGS. 1, 3, 4, and 6 may also optionally be used in any of FIGS. 2 and 5. Moreover, components, features, and details described herein for any of the apparatus may also optionally be used in any of the methods described herein, which in embodiments may be performed by and/or with such the apparatus.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8B:
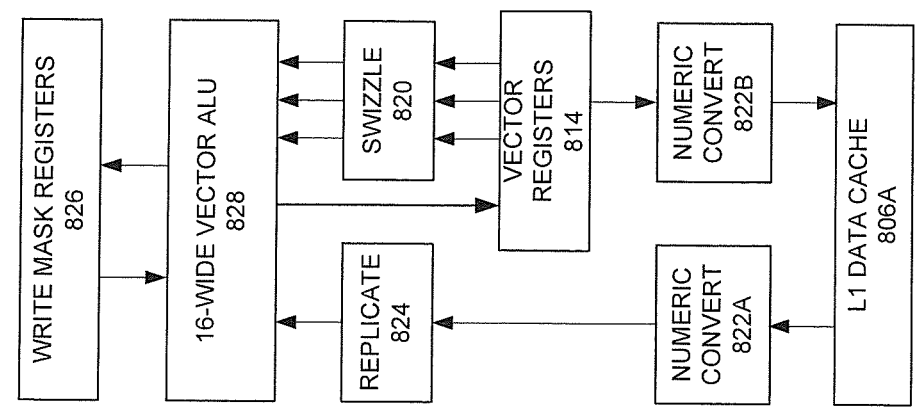
FIG. 8B is an expanded view of part of the processor core in FIG. 8A according to embodiments of the invention.
Figure 8A:
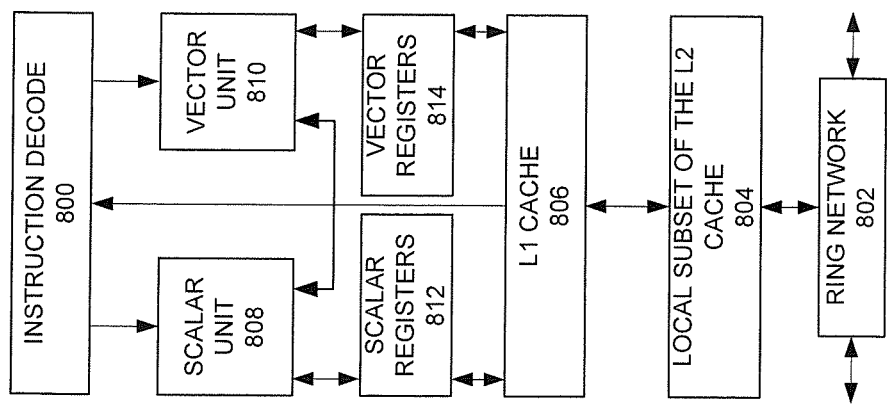
FIG. 8A is a block diagram of a single processor core, along with its connection to the on-die interconnect network and with its local subset of the Level 2 (L2) cache, according to embodiments of the invention.

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
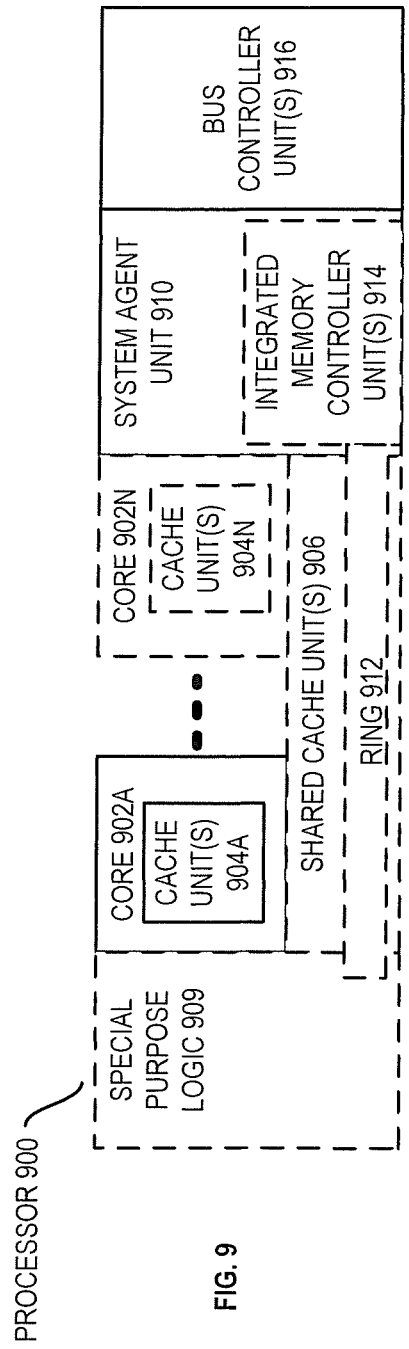
FIG. 9 is a block diagram of a processor that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
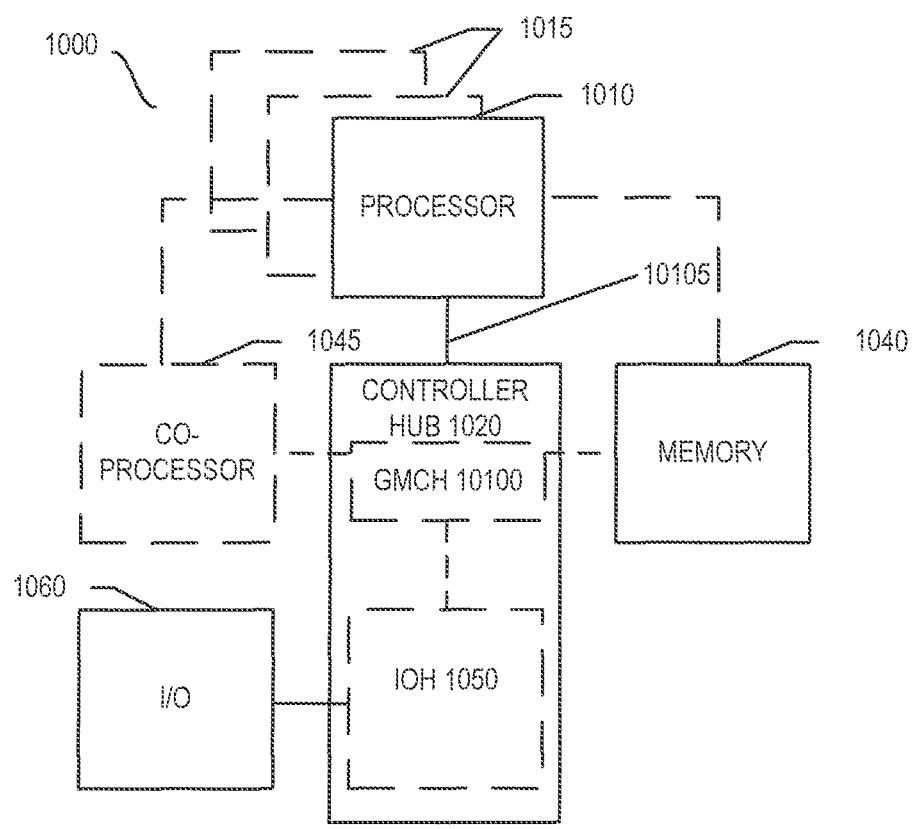
FIG. 10 shown is a block diagram of a system in accordance with one embodiment of the present invention.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
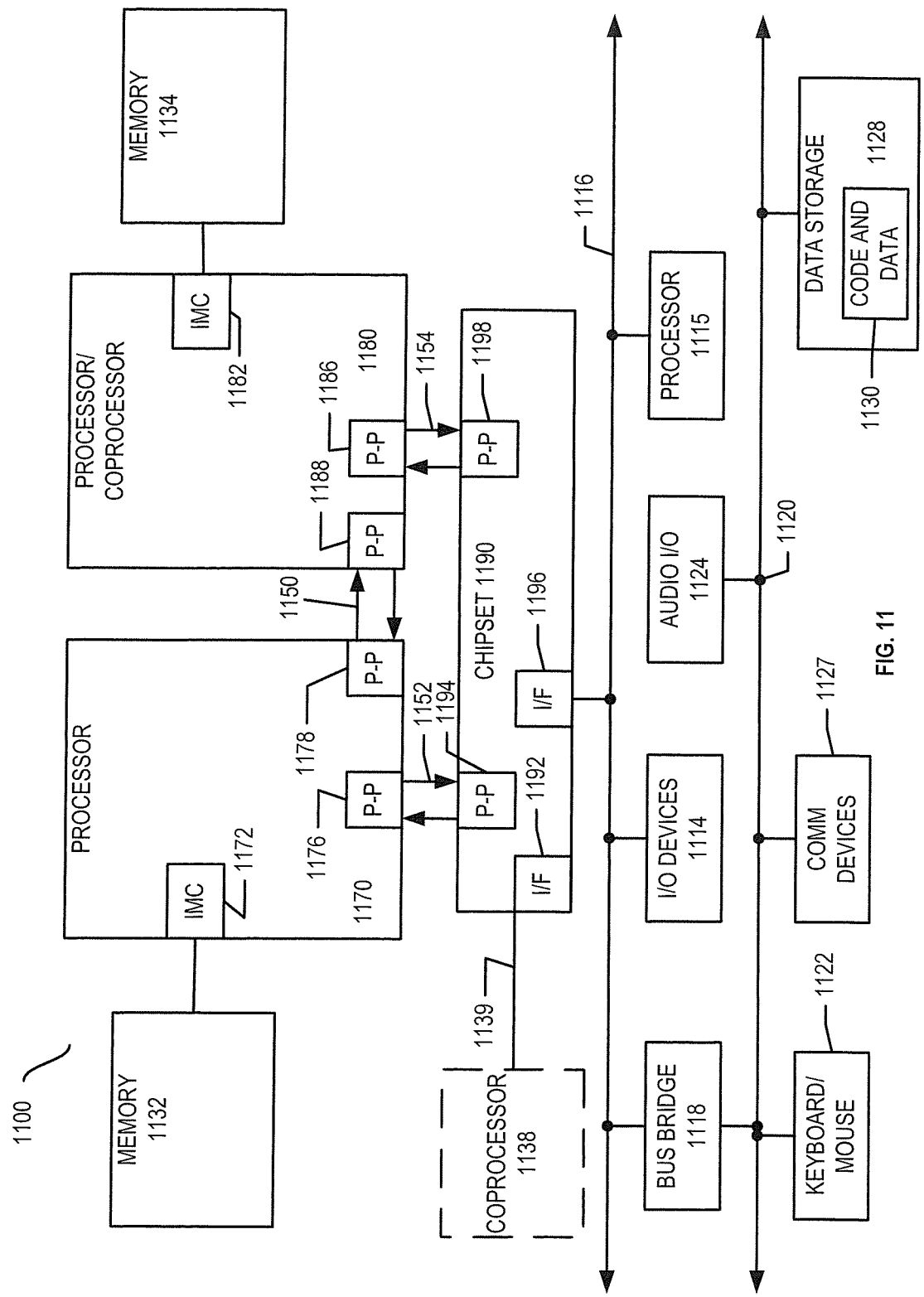
FIG. 11 shown is a block diagram of a first more specific exemplary system in accordance with an embodiment of the present invention.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
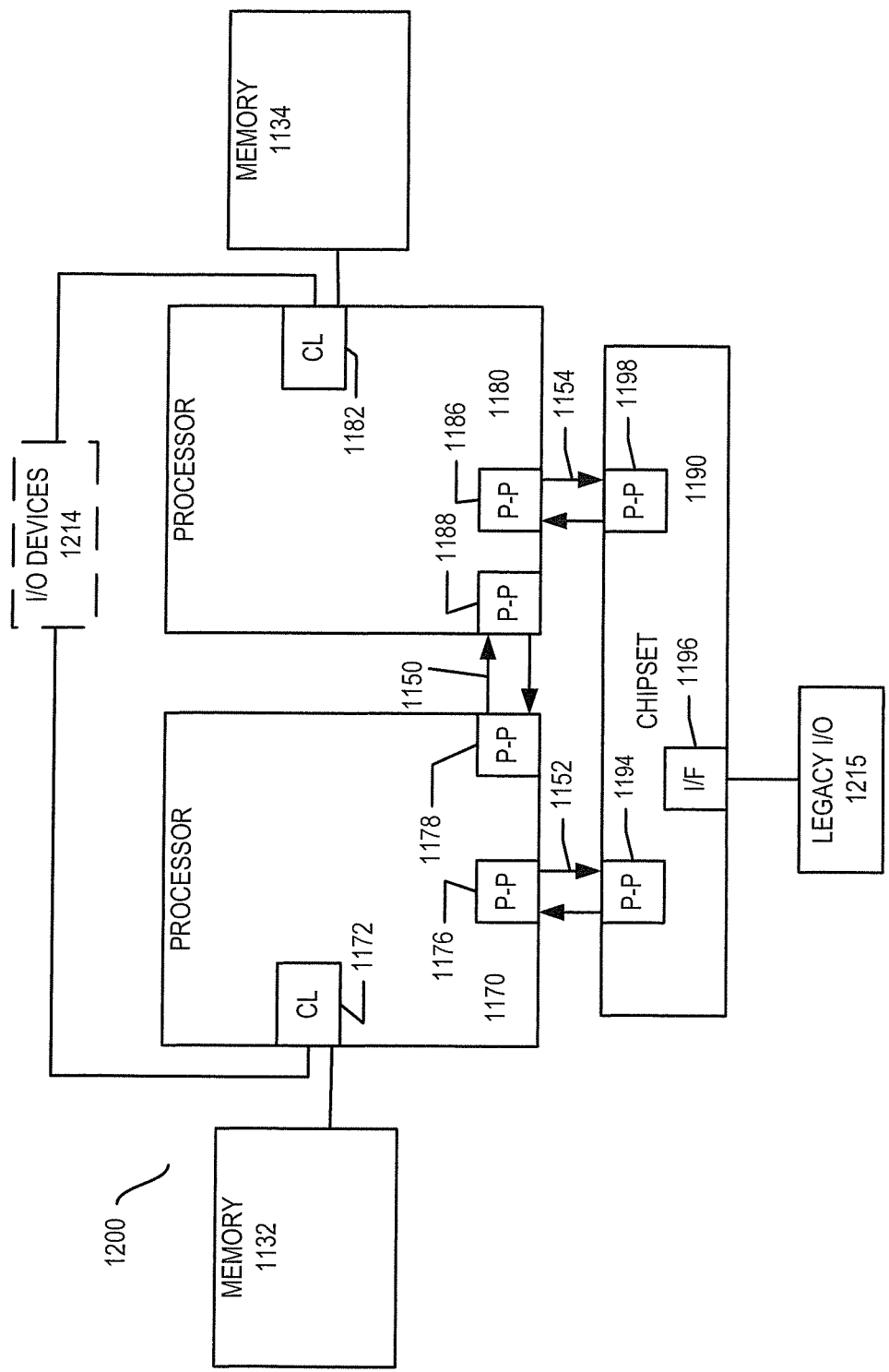
FIG. 12 shown is a block diagram of a second more specific exemplary system in accordance with an embodiment of the present invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
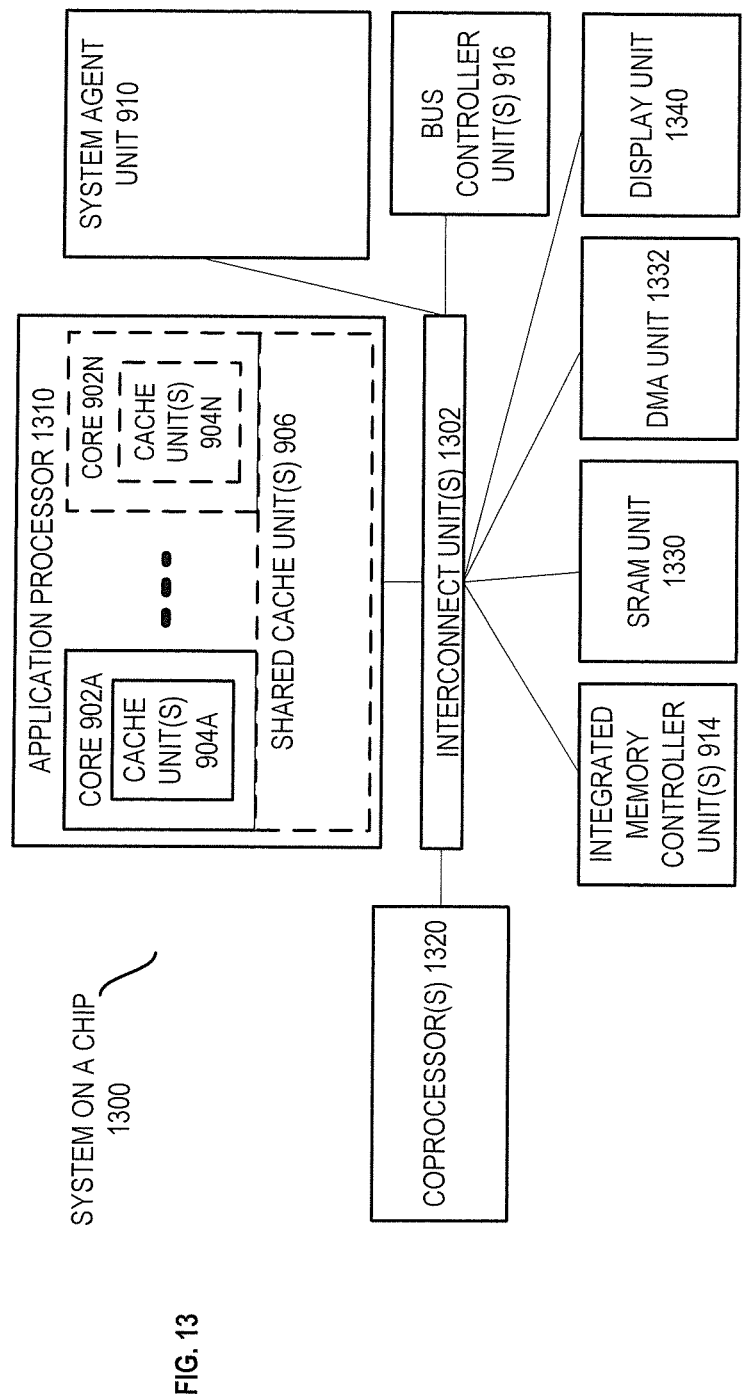
FIG. 13 shown is a block diagram of a SoC in accordance with an embodiment of the present invention.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

In the description and claims, the terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, a core may be coupled with a cache portion through one or more intervening components. In the figures, arrows are used to show connections and couplings.

In the description and/or claims, the terms "logic," "unit," "module," or "component," may have been used. It is to be understood that these may include hardware, firmware, software, or various combinations thereof. Examples of these include integrated circuitry, application specific integrated circuits, analog circuits, digital circuits, programmed logic devices, memory devices including instructions, and the like, and combinations thereof. In some embodiments, these may include transistors and/or gates and/or other circuitry components.

In the description above, specific details have been set forth in order to provide a thorough understanding of the embodiments. However, other embodiments may be practiced without some of these specific details. The scope of the invention is not to be determined by the specific examples provided above but only by the claims below. In other instances, well-known circuits, structures, devices, and operations have been shown in block diagram form or without detail in order to avoid obscuring the understanding of the description. In cases where multiple components have been shown and described, in some instances they may instead be integrated together as a single component. In other cases where a single component has been shown and described, in some instances it may be separated into two or more components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software.

Some embodiments include an article of manufacture (e.g., a computer program product) that includes a non-transitory machine-readable storage medium. The non-transitory machine-readable storage medium does not consist of a transitory propagated signal. The non-transitory machine-readable storage medium may include a mechanism that stores information in a form that is readable by a machine. The machine-readable storage medium may have stored thereon an instruction or sequence of instructions that if and/or when executed by the machine are operable to cause the machine to perform and/or result in the machine performing one or operations, methods, or techniques disclosed herein. Examples of suitable machines include, but are not limited to, processors and computer systems or other electronic devices having such processors. As various examples, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor that includes a cache-side address monitor unit corresponding to a first cache portion of a distributed cache and having a total number of cache-side address monitor storage locations that is less than a total number of logical processors of the processor. Each cache-side address monitor storage location is to store an address to be monitored. The processor also includes a core-side address monitor unit corresponding to a first core and having a same number of core-side address monitor storage locations as a number of one or more logical processors of the first core. Each core-side address monitor storage location is to store an address to be monitored and a monitor state for a different corresponding logical processor of the first core. The processor also includes a cache-side address monitor storage overflow unit corresponding to the first cache portion to enforce an address monitor storage overflow policy when no unused cache-side address monitor storage location is available to store an additional address to be monitored.

Example 2 includes the processor of any preceding example, and optionally including a core-side trigger unit corresponding to the first core and coupled with the core-side address monitor unit. The core-side trigger unit is to trigger a logical processor of the first core when a corresponding core-side address monitor storage location has a monitor state that is ready to trigger and a trigger event is detected.

Example 3 includes the processor of any preceding example, and optionally including a cache-side address monitor storage location reuse unit coupled with the cache-side address monitor unit to record monitor requests from different logical processors for a same monitor address in a common cache-side address monitor storage location.

Example 4 includes the processor of Example 3, in which the common cache-side address monitor storage location includes a structure to record the different logical processors that provided the monitor requests for the same monitor address.

Example 5 includes the processor of any preceding example, in which the processor has more than forty hardware threads, and in which the total number of the cache-side address monitor storage locations of the cache-side address monitor unit corresponding to the first cache portion is at least twenty cache-side address monitor storage locations, but less than a total number of the more than forty hardware threads.

Example 6 includes the processor of any preceding example, in which the total number of the cache-side address monitor storage locations of the cache-side address monitor unit is enough relative to the total number of logical processors of the processor that a likelihood of overflow of the cache-side address monitor storage locations is no more than one in one hundred thousand.

Example 7 includes the processor of any preceding example, in which, in response to an instruction indicating a first address to be monitored, the cache-side address monitor unit is to store the first address in a cache-side address monitor storage location. Also, the core-side address monitor unit is to store the first address in a core-side address monitor storage location.

Example 8 includes the processor of any preceding example, in which the logical processors are hardware threads.

Example 9 includes the processor of any preceding example, in which the cache-side address monitor storage overflow unit is to enforce the address monitor storage overflow policy that includes forcing read transactions to use a shared state.

Example 10 includes the processor of any preceding example, in which the cache-side address monitor storage overflow unit is to enforce the address monitor storage overflow policy that includes sending invalidation requests to all cores that could possibly have a pending monitor request.

Example 11 includes the processor of Example 10, in which the cache-side address monitor storage overflow unit is to check an overflow structure to determine which cores could possibly have a pending monitor request.

Example 12 is a system to process instructions that includes an interconnect, and a processor coupled with the interconnect. The processor includes a first address monitor unit of a cache portion control unit corresponding to a first cache portion of a distributed cache and having a total number of address monitor storage locations that is less than a total number of hardware threads of the processor. Each address monitor storage location to store an address to be monitored. The processor also includes a second address monitor unit of a core interface unit corresponding to a first core and having a same number of address monitor storage locations as a number of one or more hardware threads of the first core. Each address monitor storage location of the second address monitor unit is to store an address to be monitored and a monitor state for a different corresponding hardware thread of the first core. The processor further includes an address monitor storage overflow unit of the cache portion control unit to implement an address monitor storage overflow policy when all address monitor storage locations of the first address monitor unit are used and none are available to store an address for a monitor request. The system also includes a dynamic random access memory coupled with the interconnect, a wireless communication device coupled with the interconnect, and an image capture device coupled with the interconnect.

Example 13 includes the system of Example 12, in which the address monitor storage overflow unit is to implement the address monitor storage overflow policy that includes forcing read transactions to use a shared state, and sending invalidation requests to all cores that could possibly have a pending monitor request.

Example 14 includes the system of any of Examples 12-13, in which the processor has more than forty hardware threads, and in which the total number of the address monitor storage locations of the first address monitor unit is at least twenty but less than the total number of the more than forty hardware threads of the processor.

Example 15 includes the system of any of Examples 12-14, in which the processor further includes an address monitor storage location reuse unit of the cache portion control unit to record monitor requests from different hardware threads for a same monitor address in a common address monitor storage location.

Example 16 is a method in a processor that includes receiving a first instruction indicating an address and indicating to monitor for writes to the address at a first logical processor of a first core of a multi-core processor. In response to the first instruction, the method includes storing the address indicated by the first instruction in a first core-side address monitor storage location of a plurality of core-side address monitor storage locations that correspond to the first core. A number of the plurality of core-side address monitor storage locations is equal to a number of logical processors of the first core. The method also includes storing the address indicated by the first instruction in a first cache-side address monitor storage location of a plurality of cache-side address monitor storage locations that correspond to a first cache portion of a distributed cache. A total number of the plurality of cache-side address monitor storage locations is less than a total number of logical processors of the multi-core processor. The method further includes changing a monitor state to a speculative state.

Example 17 includes the method of Example 16, and optionally including receiving a second instruction also indicating the address and indicating to monitor for writes to the address at a second logical processor of a second core, and recording a monitor request for the address for the second core in the first cache-side address monitor storage location.

Example 18 includes the method of Example 17, in which recording the monitor request for the address for the second core in the first cache-side address monitor storage location includes changing a bit in a core mask that has a different bit corresponding to each core of the multi-core processor.

Example 19 includes the method of any preceding example, and optionally including receiving a second instruction indicating a second address and indicating to monitor for writes to the second address at the first logical processor, determining that there are no available cache-side address monitor storage locations among the plurality of cache-side address monitor storage locations that correspond to the first cache portion, and determining to enter a cache-side address monitor storage location overflow mode.

Example 20 includes the method of Example 19, and optionally including, while in the cache-side address monitor storage location overflow mode forcing all read transactions that correspond to the first cache portion to use a shared cache coherency state, and sending invalidation requests that correspond to the first cache portion to all cores of the multi-core processor that could possibly have one or more pending monitor requests.

Example 21 includes the method of any preceding example, and optionally including receiving a second instruction indicating the address at the first logical processor, and in response to the second instruction, changing the monitor state to a wait-to-trigger state.

Example 22 includes a processor or other apparatus to perform the method of any of Examples 16-21.

Example 23 includes a processor or other apparatus including means for performing the method of any of Examples 16-21.

Example 24 includes a processor including integrated circuitry and/or logic and/or units and/or components and/or modules, and/or means, or any combination thereof, to perform the method of any of Examples 16-21.

Example 25 includes an optionally non-transitory machine-readable medium that optionally stores or otherwise provides one or more instructions that if and/or when executed by a machine is operable to cause the machine to perform the method of any of Examples 16-21.

Example 26 includes a computer system including an interconnect, a processor coupled with the interconnect, and at least one of a DRAM, a graphics chip, a wireless communications chip, a phase change memory, and a video camera, the at least one coupled with the interconnect, the processor and/or the computer system to perform the method of any of Examples 16-21.

Example 27 includes a processor or other apparatus to perform one or more operations or any method substantially as described herein.

Example 28 includes a processor or other apparatus including means for performing one or more operations or any method substantially as described herein.

Example 29 includes a processor or other apparatus to perform an instruction substantially as disclosed herein.

Example 30 includes a processor or other apparatus including means for performing an instruction substantially as disclosed herein.

What is claimed is:

1. A processor comprising:
   a cache-side address monitor including at least some circuitry and corresponding to and coupled with a first cache portion of a distributed cache and having a total number of cache-side address monitor storage locations that is less than a total number of logical processors of the processor, the distributed cache including a plurality of cache portions each during operation mapped to a non-overlapping range of addresses, each cache-side address monitor storage location to store an address that the cache-side address monitor is to monitor, and an identifier associated with a logical processor for which the address stored in the cache-side address monitor storage location is to be monitored, wherein the cache-side address monitor storage locations are not part of the distributed cache;
   a core-side address monitor including at least some circuitry and corresponding to and coupled with a first core and having a same number of core-side address monitor storage locations as a number of one or more logical processors of the first core, each core-side address monitor storage location to store an address, which the core-side address monitor is to monitor writes to, and a monitor state, for a different corresponding logical processor of the first core; and
   a cache-side address monitor storage overflow unit including at least some circuitry and corresponding to and coupled with the first cache portion and coupled with the cache-side address monitor to determine that no unused cache-side address monitor storage location is available to store an additional address to be monitored and to enforce an address monitor storage overflow policy in response to the determination that no unused cache-side address monitor storage location is available to store the additional address to be monitored, wherein the address monitor storage overflow policy when enforced is to cause a plurality of logical processors to be signaled when a write to a given address being monitored is detected, but only a single logical processor is to be signaled when the write to the given address is detected when the address monitor storage overflow policy is not enforced.

2. The processor of claim 1, further comprising a core-side trigger unit including at least some circuitry corresponding to and coupled with the first core and coupled with the core-side address monitor, the core-side trigger unit to trigger a logical processor of the first core when a corresponding core-side address monitor storage location has a monitor state that is ready to trigger and a trigger event is detected.

3. The processor of claim 1, further comprising a cache-side address monitor storage location reuse unit including at least some circuitry and coupled with the cache-side address monitor to record monitor requests from different logical processors for a same monitor address in a common cache-side address monitor storage location.

4. The processor of claim 3, wherein the common cache-side address monitor storage location comprises a structure to record the different logical processors that provided the monitor requests for the same monitor address.

5. The processor of claim 1, wherein the processor has more than forty hardware threads, and wherein the total number of the cache-side address monitor storage locations of the cache-side address monitor corresponding to the first cache portion is at least twenty cache-side address monitor storage locations but less than a total number of the more than forty hardware threads.

6. The processor of claim 1, wherein, in response to an instruction that is to indicate a first address to be monitored, the cache-side address monitor is to store the first address in a cache-side address monitor storage location, and the core-side address monitor is to store the first address in a core-side address monitor storage location.

7. The processor of claim 1, wherein the one or more logical processors of the first core comprise hardware threads.

8. The processor of claim 1, wherein the cache-side address monitor storage overflow unit is to enforce the address monitor storage overflow policy including to force read transactions to use a shared state.

9. The processor of claim 1, wherein the cache-side address monitor storage overflow unit is to enforce the address monitor storage overflow policy including to send invalidation requests to only a subset of cores for which core identifiers are stored.

10. The processor of claim 9, wherein the cache-side address monitor storage overflow unit is to check an overflow structure to determine the subset of cores.

11. A system to process instructions comprising:
    an interconnect;
    a processor coupled with the interconnect, the processor including:

a cache portion control unit including a first address monitor including at least some circuitry and corresponding to and coupled with a first cache portion of a distributed cache and having a total number of address monitor storage locations that is less than a total number of hardware threads of the processor, the distributed cache including a plurality of cache portions each during operation mapped to a non-overlapping range of addresses, each address monitor storage location to store an address that the cache portion control unit is to monitor writes to, and an identifier associated with a logical processor for which the writes to the address are to be monitored, wherein the address monitor storage locations are distinct from the distributed cache;

a core interface unit including a second address monitor including at least some circuitry and corresponding to and coupled with a first core and having a same number of address monitor storage locations as a number of one or more hardware threads of the first core, each address monitor storage location of the second address monitor to store an address, which the core interface unit is to monitor writes to, and a monitor state, for a different corresponding hardware thread of the first core; and an address monitor storage overflow unit of the cache portion control unit which includes at least some circuitry and coupled with the first address monitor to detect that all address monitor storage locations of the first address monitor are used and none are available to store a first address for a first monitor request and to implement an address monitor storage overflow policy when said all of the address monitor storage locations of the first address monitor are used and none are available to store the first address for the first monitor request, wherein the address monitor storage overflow policy when implemented is to cause a plurality of logical processors to be signaled when a write to a given address being monitored is detected, but only a single logical processor is to be signaled when the write to the given address is detected when the address monitor storage overflow policy is not implemented;

a dynamic random access memory coupled with the interconnect;

a wireless communication device coupled with the interconnect; and an image capture device coupled with the interconnect.

12. The system of claim 11, wherein the address monitor storage overflow unit is to implement the address monitor storage overflow policy including to:

force read transactions to use a shared state; and send invalidation requests to only a subset of cores for which core identifiers are stored.

13. The system of claim 11, wherein the processor has more than forty hardware threads, and wherein the total number of the address monitor storage locations of the first address monitor is at least twenty but less than the total number of the more than forty hardware threads of the processor.

14. The system of claim 11, wherein the processor further comprises an address monitor storage location reuse unit of the cache portion control unit including at least some circuitry to record monitor requests from different hardware threads for a same monitor address in a common address monitor storage location.

15. A method in a processor comprising:

receiving a first instruction indicating an address and indicating to monitor for writes to the address at a first logical processor of a first core of a multi-core processor; and in response to the first instruction:

storing the address indicated by the first instruction in a first core-side address monitor storage location of a plurality of core-side address monitor storage locations that correspond to the first core, wherein a number of the plurality of core-side address monitor storage locations is equal to a number of logical processors of the first core;

storing the address indicated by the first instruction in a first cache-side address monitor storage location of a plurality of cache-side address monitor storage locations that correspond to a first cache portion of a distributed cache that includes a plurality of cache portions that each are mapped to a non-overlapping range of addresses, wherein the plurality of the cache-side address monitor storage locations are not part of the distributed cache, and wherein a total number of the plurality of cache-side address monitor storage locations is less than a total number of logical processors of the multi-core processor;

storing an identifier of the first core in the first cache-side address monitor storage location;

activating the processor to monitor for writes to the address;

changing a monitor state to a speculative state;

signaling only the first core when a write to the address is detected;

receiving a second instruction indicating a second address and indicating to monitor for writes to the second address at the first logical processor;

determining that there are no available cache-side address monitor storage locations among the plurality of cache-side address monitor storage locations that correspond to the first cache portion; and determining to enter a cache-side address monitor storage location overflow mode;

signaling a plurality of cores, when in the overflow mode, when a write to the second address is detected.

16. The method of claim 15, further comprising:

receiving a third instruction also indicating the address and indicating to monitor for writes to the address at a second logical processor of a second core; and recording a monitor request for the address for the second core in the first cache-side address monitor storage location.

17. The method of claim 16, wherein recording the monitor request for the address for the second core in the first cache-side address monitor storage location comprises changing a bit in a core mask that has a different bit corresponding to each core of the multi-core processor.

18. The method of claim 15, further comprising, while in the cache-side address monitor storage location overflow mode:

forcing all read transactions that correspond to the first cache portion to use a shared cache coherency state; and sending invalidation requests that correspond to the first cache portion to only a subset of cores of the multi-core processor that have one or more pending monitor requests.

19. The method of claim 15, further comprising:
receiving a third instruction indicating the address at the first logical processor; and
in response to the second instruction, changing the monitor state to a wait-to-trigger state.

20. The method of claim 15, wherein the number of the plurality of the core-side address monitor storage locations is equal to a number of hardware threads of the first core.

21. The method of claim 15, further comprising detecting a write to the address and sending a wakeup signal to the first logical processor from a core-side trigger unit.

* * * * *